(12) United States Patent
Araki et al.

(10) Patent No.: US 8,588,945 B2
(45) Date of Patent: Nov. 19, 2013

(54) REPRODUCTION APPARATUS, REPRODUCTION METHOD AND REPRODUCTION PROGRAM

(75) Inventors: Satoshi Araki, Kanagawa (JP); Susumu Ijichi, Kanagawa (JP); Ryo Mukaiyama, Tokyo (JP); Takaomi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1604 days.

(21) Appl. No.: 11/848,595

(22) Filed: Aug. 31, 2007

(65) Prior Publication Data

US 2008/0065248 A1     Mar. 13, 2008

(30) Foreign Application Priority Data

Sep. 7, 2006  (JP) .............................. P2006-242825

(51) Int. Cl.
*G06F 17/00*    (2006.01)

(52) U.S. Cl.
USPC .... 700/94; 369/30.01; 369/30.04; 369/30.07; 369/30.08

(58) Field of Classification Search
USPC .......................................................... 700/94
See application file for complete search history.

(56) References Cited

U.S. PATENT DOCUMENTS

| | | | |
|---|---|---|---|
| 8,422,853 B2* | 4/2013 | Murabayashi et al. ....... | 386/241 |
| 2003/0021055 A1 | 1/2003 | Tange et al. | |
| 2005/0038819 A1 | 2/2005 | Hicken et al. | |
| 2006/0088292 A1* | 4/2006 | Guillen et al. ................. | 386/96 |
| 2006/0153040 A1* | 7/2006 | Girish et al. ............... | 369/59.21 |
| 2006/0185501 A1 | 8/2006 | Shiraishi et al. | |
| 2007/0286579 A1* | 12/2007 | Murabayashi et al. ......... | 386/96 |
| 2008/0058973 A1* | 3/2008 | Hirata et al. .................... | 700/94 |

FOREIGN PATENT DOCUMENTS

| | | |
|---|---|---|
| EP | 1 435 620 A1 | 7/2004 |
| EP | 1 437 738 A1 | 7/2004 |
| EP | 1 784 012 A1 | 5/2007 |
| JP | 2000-222262 | 8/2000 |
| JP | 2001-210007 | 8/2001 |
| JP | 2003-5756 | 1/2003 |
| JP | 2004-302053 | 10/2004 |
| JP | 2005-198143 | 7/2005 |
| JP | 2006-18894 | 1/2006 |
| WO | WO 2005/106877 A1 | 11/2005 |
| WO | WO 2006/016590 A1 | 2/2006 |
| WO | WO 2006/087891 A1 | 8/2006 |

OTHER PUBLICATIONS

Office Action issued Jul. 5, 2011, in Japanese Patent Application No. 2006-242825.

* cited by examiner

*Primary Examiner* — Paul McCord
(74) *Attorney, Agent, or Firm* — Oblon, Spivak, McClelland, Maier & Neustadt, L.L.P.

(57) ABSTRACT

Disclosed herein is a reproduction apparatus for reproducing audio data. The apparatus includes: an analysis section configured to start an analysis of characteristics of audio data recorded on a recording medium as audio data having its characteristic unanalyzed yet upon detection of a predetermined state of a light processing load borne by the reproduction apparatus. The apparatus further includes a registration section configured to register audio data having its characteristic already analyzed on a specific play list prescribing an order of reproduction of audio data on the basis of the characteristics of the audio data; and a reproduction section configured to reproduce audio data from the recording medium in accordance with the specific play list.

17 Claims, 17 Drawing Sheets

FIG.12

| NUMERICAL DATA ||  |
|---|---|---|
| CHARACTERISTIC ITEM || CHARACTERISTIC NUMBER |
| BASIC | TEMPO | 100 |
| | DISPERSION | 30 |
| | MAJOR | 45 |
| | ⋮ | ⋮ |
| | RHYTHMRATIO | 60 |
| ATMOSPHERE | ACOUSTIC | 30 |
| | ENERGY | 42 |
| | CLASSIC | 25 |
| | JAZZ | 63 |
| | ⋮ | ⋮ |
| | CAFE | 42 |
| IMPRESSION | HAPPY | 56 |
| | SAD | 24 |
| | BRIGHT | 55 |
| | JOYFUL | 48 |
| | ⋮ | ⋮ |
| | FRESH | 43 |

| LIST NAME | REGISTRATION CONDITIONS | |
|---|---|---|
| LIST NAME 1 | THE CHARACTERISTIC NUMBER OF CHARACTERISTIC ITEM (1) IS AT LEAST 50. | EXCLUSIVE GROUP (α) |
| LIST NAME 2 | THE CHARACTERISTIC NUMBER OF CHARACTERISTIC ITEM (2) IS AT LEAST 75 AND THE CHARACTERISTIC NUMBER OF CHARACTERISTIC ITEM (3) IS SMALLER THAN 40. | |
| LIST NAME 3 | THE CHARACTERISTIC NUMBER OF CHARACTERISTIC ITEM (1) IS SMALLER THAN 35 AND THE CHARACTERISTIC NUMBER OF CHARACTERISTIC ITEM (4) IS AT LEAST 80. | EXCLUSIVE GROUP (α) |
| ... | ... | |
| LIST NAME N | THE CHARACTERISTIC NUMBER OF CHARACTERISTIC ITEM (3) IS AT LEAST 40 BUT SMALLER THAN 70. | EXCLUSIVE GROUP (β) |

RET1

FIG.14

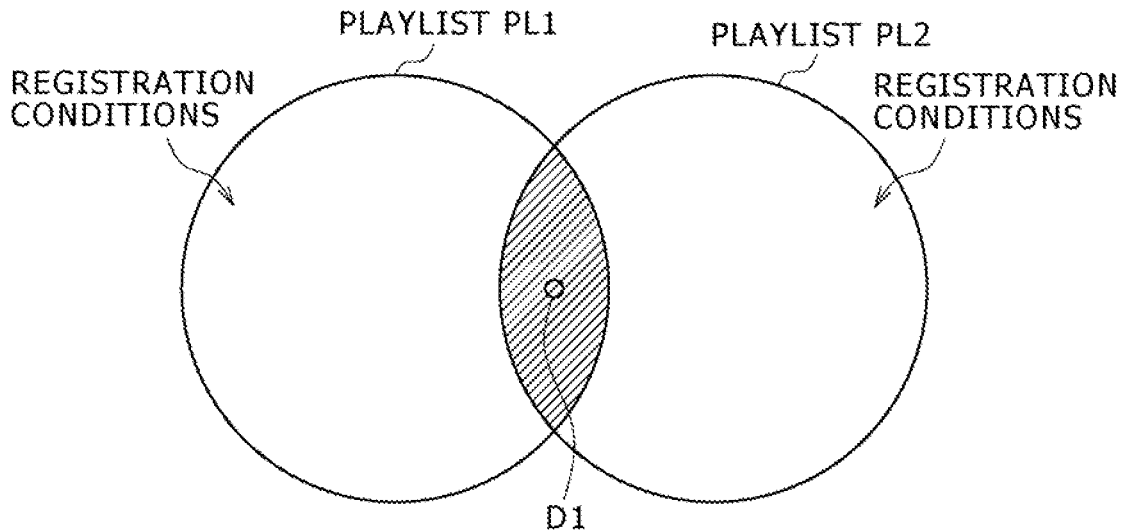

FIG.15

| AUDIO DATA | CHARACTERISTIC NUMBER OF CHARACTERISTIC ITEM (1) | CHARACTERISTIC NUMBER OF CHARACTERISTIC ITEM (2) |
|---|---|---|
| AUDIO DATA D1A | 70 | 50 |
| AUDIO DATA D1B | 50 | 40 |
| AUDIO DATA D1C | 50 | 50 |
| AUDIO DATA D1D | 40 | 70 |

FIG.16

| LIST NAME | REGISTRATION CONDITION |
|---|---|
| LIST NAME X | THE CHARACTERISTIC NUMBER OF CHARACTERISTIC ITEM (1) IS AT LEAST 65 AND THE CHARACTERISTIC NUMBER OF CHARACTERISTIC ITEM (2) IS AT LEAST 30. |
| LIST NAME Y | THE CHARACTERISTIC NUMBER OF CHARACTERISTIC ITEM (1) IS AT LEAST 55 AND THE CHARACTERISTIC NUMBER OF CHARACTERISTIC ITEM (2) IS AT LEAST 45. |

FIG.17

| AUDIO DATA | REGISTRATION PLAY LISTS |
|---|---|
| AUDIO DATA D1A | PLAY LISTS WIHT LIST NAMES X AND Y |
| AUDIO DATA D1B | NONE |
| AUDIO DATA D1C | NONE |
| AUDIO DATA D1D | NONE |

FIG.18

| LIST NAME | REGISTRATION CONDITION |
|---|---|
| LIST NAME X | THE CHARACTERISTIC NUMBER OF CHARACTERISTIC ITEM (1) IS AT LEAST 45 AND THE CHARACTERISTIC NUMBER OF CHARACTERISTIC ITEM (2) IS AT LEAST 30. |
| LIST NAME Y | THE CHARACTERISTIC NUMBER OF CHARACTERISTIC ITEM (1) IS AT LEAST 35 AND THE CHARACTERISTIC NUMBER OF CHARACTERISTIC ITEM (2) IS AT LEAST 45. |

FIG.19

| AUDIO DATA | REGISTRATION PLAY LISTS |
|---|---|
| AUDIO DATA D1A | PLAY LISTS WITH LIST NAMES X AND Y |
| AUDIO DATA D1B | PLAY LIST WITH LIST NAME X |
| AUDIO DATA D1C | PLAY LISTS WITH LIST NAMES X AND Y |
| AUDIO DATA D1D | PLAY LIST WITH LIST NAME Y |

FIG.20

| AUDIO DATA | REGISTRATION PLAY LISTS |
|---|---|
| AUDIO DATA D1A | PLAY LISTS WITH LIST NAMES X AND Y |
| AUDIO DATA D1B | PLAY LIST WITH LIST NAME X |
| AUDIO DATA D1C | PLAY LIST WITH LIST NAME Y |
| AUDIO DATA D1D | NONE |

FIG.21

| CLUSTER NUMBER | CLUSTER CENTER VALUE | LIST NAME |
|---|---|---|
| 1 | CC1 | LIST NAME P |
| 2 | CC2 | LIST NAME Q |
| 3 | CC3 | LIST NAME T |
| 4 | CC4 | LIST NAME R |
| 5 | CC5 | LIST NAME S |
| ⋮ | ⋮ | ⋮ |
| N | CCN | LIST NAME S |

RET2

REPRODUCTION APPARATUS, REPRODUCTION METHOD AND REPRODUCTION PROGRAM

CROSS REFERENCES TO RELATED APPLICATIONS

The present invention contains subject matter related Japanese Patent Application JP 2006-242825 filed in the Japan Patent Office on Sep. 7, 2006, the entire contents of which being incorporated herein by reference.

BACKGROUND OF THE INVENTION

1. Field of the Invention

The present invention relates to a reproduction apparatus, a reproduction method and a reproduction program. More particularly, the present invention relates to a reproduction apparatus for reproducing audio data typically in accordance with a play list prescribing an order of reproduction of the audio data, a reproduction method adopted by the reproduction apparatus and a reproduction program implementing the reproduction method.

2. Description of the Related Art

In a process to reproduce an audio signal, the existing reproduction apparatus detects the position of a level peak in a predetermined unit time interval of the audio signal and also detects a time distance between a predetermined peak position and another peak position. Then, on the basis of a frequently generated time distance found among time distances detected in this way, the existing reproduction apparatus identifies the tempo of a sound represented by the audio signal. For more information, the reader is suggested to refer to a document such as page 4 of Japanese Patent laid-open No. 2004-302053.

SUMMARY OF THE INVENTION

However, the existing reproduction apparatus with the configuration described above analyses a characteristic of an audio signal while reproducing the signal. An example of the characteristic is the tempo of audio data represented by the audio signal. Thus, the reproduction apparatus must bear a heavy processing load during a process to reproduce an audio signal. As a result, the reproduction apparatus raises a problem that it is quite within the bounds of possibility that a stable operation can no longer be hoped for.

Addressing the problem described above, inventors of the present invention have proposed a reproduction apparatus capable of carrying out a stable operation to reproduce audio data, a reproduction method to be adopted by the reproduction apparatus and a reproduction program implementing the reproduction method.

In order to solve the problem, in accordance with one embodiment of the present invention, when a reproduction apparatus provided by the present invention detects a state in which the processing load borne by the main unit of the reproduction apparatus is light, the reproduction apparatus analyzes the characteristic of audio data recorded on a recording medium as audio data having its characteristic unanalyzed yet and registers the audio data having the characteristic thereof analyzed on a specific play list in accordance with the analyzed characteristic. Then, the reproduction apparatus reproduces audio data registered on the specific play list in accordance with the play list.

As described above, in accordance with one embodiment of the present invention, when a reproduction apparatus provided by the present invention detects a state in which the processing load borne by the main unit of the reproduction apparatus is light, the reproduction apparatus analyzes the characteristic of audio data recorded on a recording medium as audio data having its characteristic unanalyzed yet and registers the audio data having the characteristic thereof already analyzed on a specific play list in accordance with the result of the analysis. Thus, it is possible to prevent the processing load from rising substantially during an operation to reproduce audio data due to the processing to analyze the characteristic of audio data having its characteristic unanalyzed yet and the processing to register the audio data with the characteristic thereof already analyzed on a play list.

In accordance with the one embodiment of the present invention, when a reproduction apparatus provided by the present invention detects a state in which the processing load borne by the main unit of the reproduction apparatus is light, the reproduction apparatus analyzes the characteristic of audio data recorded on a recording medium as audio data having its characteristic unanalyzed yet and registers the audio data having the characteristic thereof already analyzed on a specific play list in accordance with the analyzed characteristic. Then, the reproduction apparatus reproduces audio data registered on the specific play list in accordance with the specific play list. Thus, it is possible to prevent the processing load from rising substantially during an operation to reproduce audio data due to the processing to analyze the characteristic of audio data having its characteristic unanalyzed yet and the processing to register the audio data having its characteristic already analyzed on a play list. In addition, it is also possible to implement a reproduction apparatus capable of carrying out a stable operation to reproduce audio data, a reproduction method to be adopted by the reproduction apparatus and a reproduction program implementing the reproduction method.

BRIEF DESCRIPTION OF THE DRAWINGS

These and other features of the present invention will become clear from the following description of the preferred embodiments given with reference to the accompanying diagrams, in which:

FIG. 12 is an explanatory diagram roughly showing the structure of characteristic numerical information representing the characteristic of audio data;

FIG. 13 is an explanatory diagram roughly showing the structure of a first registration-condition table;

FIG. 14 is a rough explanatory diagram to be referred to in description of an exclusive group;

FIG. 15 is a rough explanatory diagram to be referred to in description of characteristic numbers of each audio data;

FIG. 16 is a rough explanatory diagram to be referred to in description of relatively strict registration conditions;

FIG. 17 is a rough explanatory diagram to be referred to in description of a process to register audio data on play lists PL imposing the relatively strict registration conditions;

FIG. 18 is a rough explanatory diagram to be referred to in description of relatively lenient registration conditions;

FIG. 19 is a rough explanatory diagram to be referred to in description of a process to register audio data on play lists imposing the relatively lenient registration conditions;

FIG. 20 is a rough explanatory diagram to be referred to in description of a process to register audio data on play lists;

FIG. 21 is an explanatory diagram roughly showing the structure of a second registration-condition table;

DETAILED DESCRIPTION OF THE PREFERRED EMBODIMENTS

Preferred embodiments of the invention are described by referring to diagrams as follows.

(1) First Embodiment

(1-1) Outline of a Reproduction Apparatus According to a First Embodiment

Figure 1:
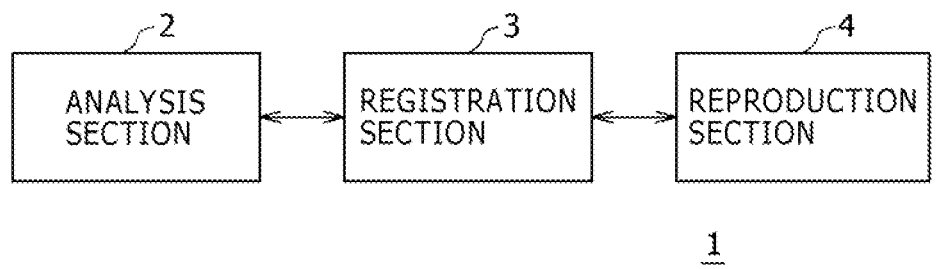
FIG. 1 is a diagram showing an outline of a reproduction apparatus according to a first embodiment.

FIG. 1 is a diagram showing an outline of a reproduction apparatus according to a first embodiment. Reference numeral 1 in the figure denotes the reproduction apparatus. The reproduction apparatus 1 is capable of reproducing audio data in accordance with a play list prescribing an order of reproduction of the audio data. As shown in the figure, the reproduction apparatus 1 employs an analysis section 2 for analyzing the characteristic of audio data recorded on a recording medium as audio data having its characteristic unanalyzed yet when the reproduction apparatus 1 detects a state in which the processing load borne by the main unit of the reproduction apparatus 1 is light. The reproduction apparatus 1 also employs a registration section 3 for registering a piece of audio data having the characteristic thereof analyzed by the characteristic analysis section 2 on a play list in accordance with the analyzed characteristic. In addition, the reproduction apparatus 1 also employs a reproduction section 4 for reproducing audio data registered on the play list in accordance with the play list. By providing the reproduction apparatus 1 with the configuration described above, it is possible to prevent a processing load from rising substantially at a power-on time due to the processing to analyze the characteristic of audio data and the processing to register the audio data on a play list. In addition, it is also possible to implement a reproduction apparatus capable of carrying out a stable operation to reproduce audio data.

Figure 2:
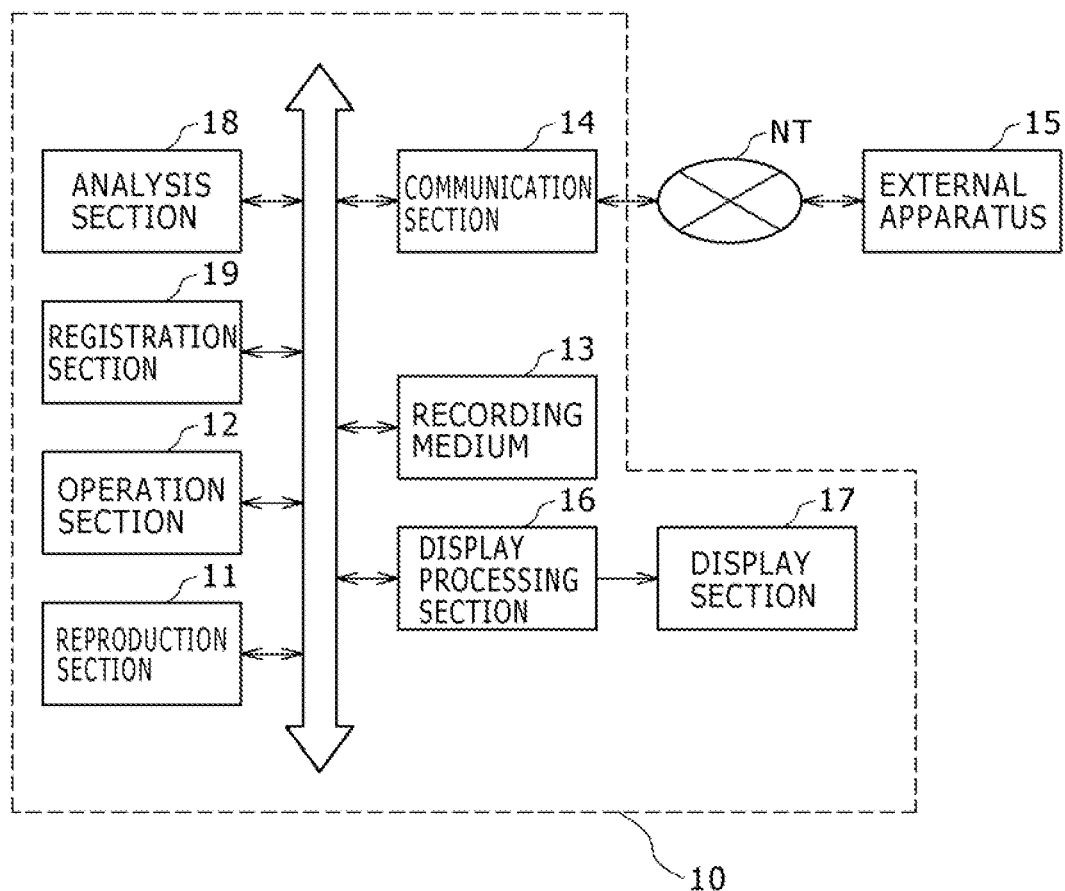
FIG. 2 is a functional block diagram showing a detailed hardware configuration of the reproduction apparatus according to the first embodiment.

(1-2) Detailed Configuration of the Reproduction Apparatus According to the First Embodiment FIG. 2 is a diagram showing a functional circuit block to describe detailed hardware configuration of a reproduction apparatus 10 according to the first embodiment. As shown in the figure, the reproduction apparatus 10 employs a reproduction section 11 for carrying out a variety of functions such as a content reproduction function, a content recording function and a list-based reproduction function. The content reproduction function is a function for reproducing audio data from a recording medium mounted on the reproduction apparatus 10. An example of the recording medium is a CD (Compact Disc). The content recording function is a function for reading out audio data recorded on the recording medium and recording the content onto a recording medium 13 employed in the reproduction apparatus 10. The list-based reproduction function is a function for reproducing audio data from the recording medium 13 in accordance with a play list also recorded on the recording medium 13. Of course, a CPU may load programs corresponding to a variety of functions, which are supposed to be carried out by the functional blocks, from a ROM or an HDD into a RAM and execute the programs loaded in the RAM in order to carry out the functions.

Figure 3:
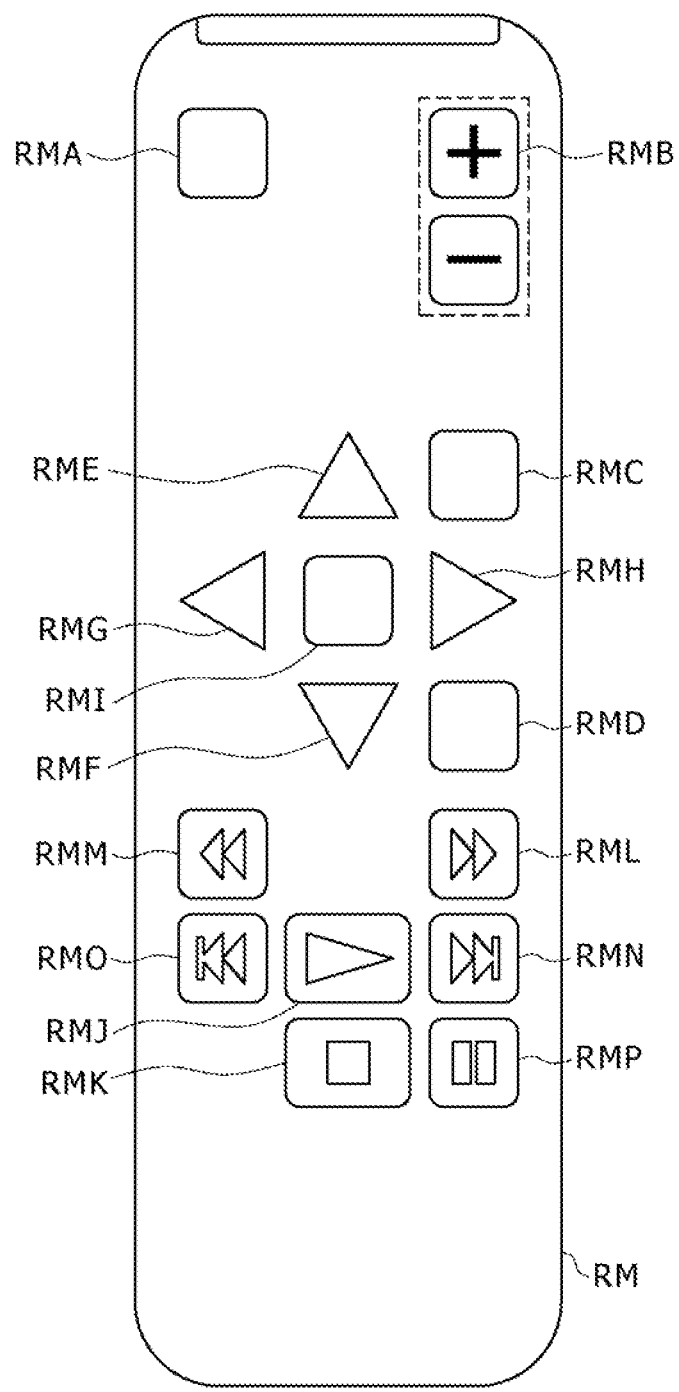
FIG. 3 is a diagram roughly showing the configuration of a remote controller.

The reproduction apparatus 10 also employs an operation section 12 including an RM (Remote Controller) having a rectangular solid shape like one shown in FIG. 3. At one end of the front face of the remote controller RM, there are provided a toggle-type power-supply button RMA and volume adjustment buttons RMB. The toggle-type power-supply button RMA is a button to be operated to turn on and off the power supply of the apparatus main unit, that is, the power supply of the reproduction apparatus 10. The volume adjustment buttons RMB are buttons to be operated to adjust the volume of audio data being reproduced. At the center of the front face of the remote controller RM, there are provided a toggle-type function selection button RMC and a toggle-type setting button RMD. The toggle-type function selection button RMC is a button for selecting one of the functions described above by being operated to switch the reproduction apparatus 10 from one function to another. The toggle-type setting button RMD is a button to be operated to call one of a variety of set items. In addition to the buttons RMC and RMD, also at the center of the front face of the remote controller RM, there are provided an upward-direction selection button RME, a downward-direction selection button RMF, a left-direction selection button RMG and a right-direction selection button RMH. The upward-direction selection button RME, the downward-direction selection button RMF, the left-direction selection button RMG and the right-direction selection button RMH each have a triangular shape with its vertex oriented respectively in the upward, downward, leftward or rightward of the front face of the remote controller RM. The upward-direction selection button RME is a button to be operated to select the upward direction to be described later. The downward-direction selection button RMF is a button to be operated to select the downward direction to be described later. The left-direction selection button RMG is a button to be operated to select the direction toward the left side to be described later. The right-direction selection button RMH is a button to be operated to select the direction toward the right side to be described later. At the center of an area occupied by the buttons RME, RMF, RMG and RMH, there is provided a confirmation button RMI to be operated to confirm typically selection of an item appearing on a display screen.

In addition, at a position close to the other end of the front face of the remote controller RM, there are provided a reproduction-start button RMJ, a reproduction stop button RMK, a fast-forward button RML, a rewind button RMM, a music-forward button RMN, a music-backward button RMO and a temporary stop button RMP. The reproduction-start button RMJ is a button to be operated for controlling reproduction of audio data. Thus, the reproduction apparatus 10 allows the user to operate the toggle-type function selection button RMC provided on the remote controller RM of the operation section 12 by pressing the button in order to easily select one of the functions described above.

When the user operates the operation section 12, that is, when the user operates the remote controller RM, to enter a command to select the content reproduction function, the reproduction section 11 employed in the reproduction apparatus 10 starts the content reproduction function. In this case, the reproduction section 11 reproduces audio data recorded on a recording medium mounted on the reproduction apparatus 10 from the medium and outputs the reproduced content as a piece of music. In this way, the reproduction apparatus 10 is capable of letting the user listen to the music according to the audio data.

In addition, when the user operates the operation section 12, that is, when the user operates the remote controller RM, to enter a command to select the content recording function, the reproduction section 11 employed in the reproduction apparatus 10 starts the content recording function. In this case, the reproduction section 11 reads out audio data from a recording medium mounted on the reproduction apparatus 10, compresses and codes the content in accordance with a compression and coding method determined in advance and records the content onto a recording medium 13 employed in the reproduction apparatus 10. In this way, the reproduction section 11 records the audio data onto the recording medium 13 in a predetermined format such as an ATRAC3 (Adaptive Transform Acoustic Coding 3) format, an AAC (Advanced Audio Coding) format, a WMA (Windows (a registered trademark) Media Audio) format, a Real AUDIO G2 Music Codec format or an MP3 (MPEG Audio Layer—3) format.

In addition, when the user operates the operation section 12, that is, when the user operates the remote controller RM, to enter a content acquisition command to obtain audio data, the reproduction section 11 employed in the reproduction apparatus 10 makes an access through the communication section 14 to the external apparatus 15 connected to the network NT in order to request the external apparatus 15 to transmit the audio data. As a result, the external apparatus 15 downloads the audio data to the reproduction section 11 by way of the communication section 14 and the reproduction section 11 passes on the content to the recording medium 13. That is to say, the reproduction section 11 records the audio data downloaded from the external apparatus 15 as a content having a format determined in advance onto the recording medium 13.

Figure 4:
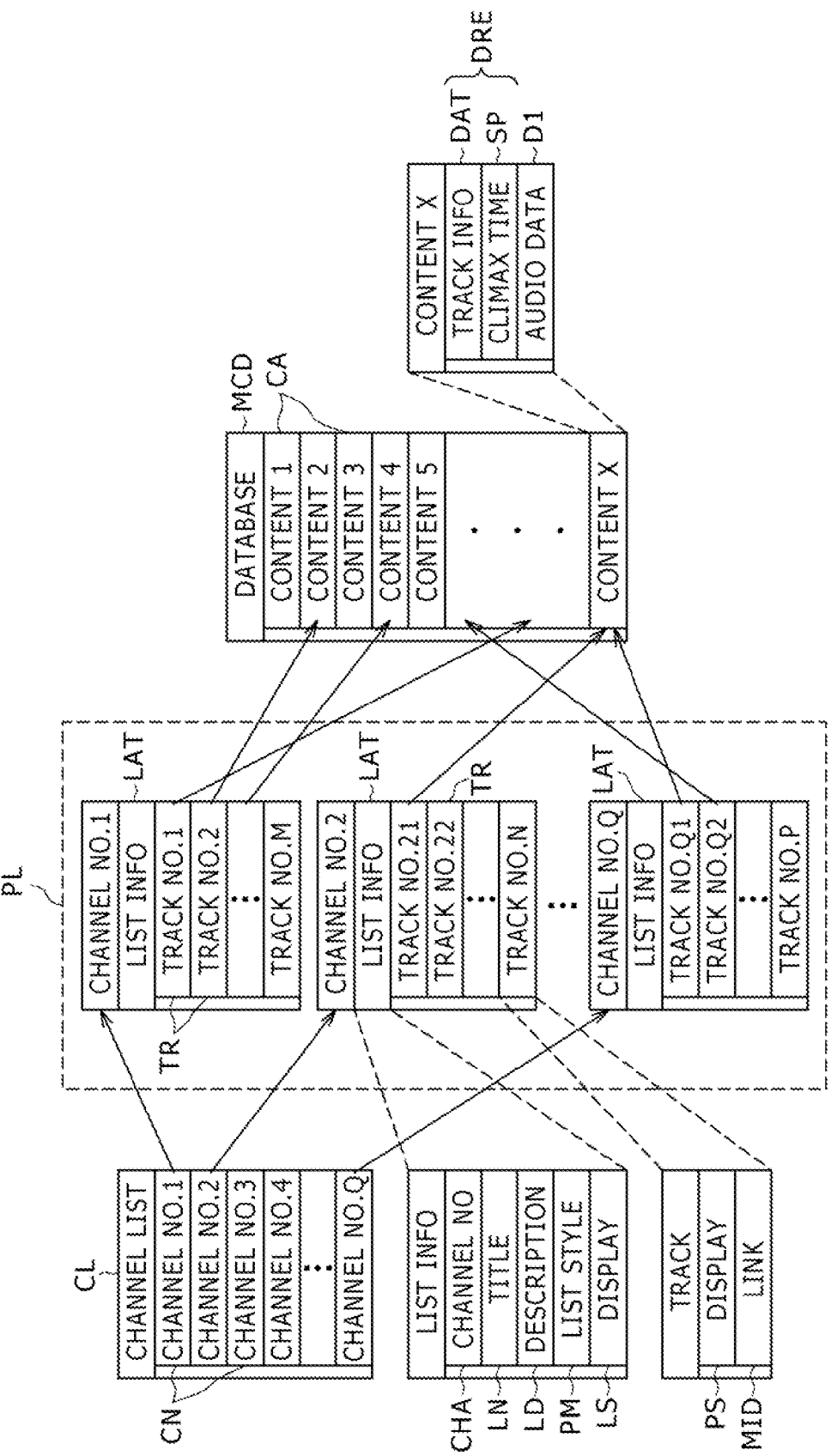
FIG. 4 is a diagram roughly showing the structures of a play list and a musical-content database.

As shown in FIG. 4, a musical-content database MDB is constructed in the recording medium 13. The musical-content database MDB is a database for managing audio data. The reproduction section 11 records an audio data D1 read out from a recording medium mounted on the reproduction apparatus 10 by carrying out the content recording function or an audio data D1 downloaded from the external apparatus 15 onto the audio data database MDB stored in the recording medium 13 along with relevant information DRE related to the audio data D1 a musical-content management information CA. In the following description, the relevant information DRE related to an audio data is referred to as content-related information. In this case, the content-related information DRE relevant to an audio data D1 has information on attributes of the audio data D1 and characteristic-position information SP showing the position of a portion serving as a characteristic of music according to the audio data D1. In the following description, the information on attributes of an audio data D1 is referred to as content attribute information DAT of the audio data D1. The position of a portion serving as a characteristic of music according to an audio data D1 is a position in the audio data D1. The information on a characteristic of music according to an audio data D1 is typically referred to as chorus. In the following description, the information on a characteristic of music according to an audio data D1 is referred to as the characteristic information of the audio data D1. Typically, the position of a portion serving as a characteristic of music according to an audio data D1 is the position of the start of the chorus of the audio data D1. In the following description, the position of the start of a portion serving as a characteristic of music according to an audio data D1 is referred to as the characteristic position of the audio data D1.

The content attribute information DAT of an audio data D1 includes a musical-content title, an artist name and a genre name. The musical-content title is the title of music according to the audio data D1. The artist name is the name of an artist for the audio data D1. The genre name is the name of a genre to which the music according to the audio data D1 pertains. In addition, the content attribute information DAT of an audio data D1 also includes various kinds of data related to the audio data D1 and image data of a picture of a jacket for an album including the audio data D1. The data related to the audio data D1 includes the provider providing the audio data D1, the recording date and time of the audio data D1, the total reproduction time of the audio data D1 and an address at which the audio data D1 is recorded on the recording medium 13. In this case, the provider providing the audio data D1 is the recording medium or the external apparatus 15. In the following description, the image data of a picture of a jacket for an album including an audio data D1 is referred to as the jacket picture image data of the audio data D1. By the way, the content attribute information DAT of an audio data D1 is downloaded from an external information providing apparatus shown in none of the figures during execution of the content recording function to record the audio data D1 read out from a recording medium mounted on the reproduction apparatus 10 onto the recording medium 13 or downloaded from the external apparatus 15 along with the audio data D1 in execution of a content acquisition command to obtain the audio data D1 from the external apparatus 15.

In addition, the recording medium 13 is also used for recording a plurality of different play lists PL each prescribing the order of reproduction of a plurality of audio data D1. On top of that, the recording medium 13 is also used for recording a list CL of a plurality of channels each assigned to one of the play lists PL in the same way as, for example, the channels each assigned to a radio station as a channel selecting the radio station. By the way, the channel list CL of a plurality of channels is typically used for storing channel numbers CN by arranging the channel numbers CN in a predetermined order such as the sequential order of increasing channel numbers CN. The channel numbers CN each assigned to any specific one of the channels are each used as identification information for individually identifying the specific channel.

In this case, the play list PL has information on attributes of the play list PL. In the following description, the information on attributes of a play list PL is referred to as the list attribute information LAT of the play list PL. In addition, the play list PL includes a plurality of pieces of track registration information TR. Each piece of track registration information TR is used for registering one of a plurality of audio data D1 on the play list PL. The pieces of track registration information TR are stored on the play list PL by arranging them in an arbitrarily selected order in which the audio data D1 are to be reproduced.

The list attribute information LAT of a play list PL also includes channel assignment information CHA and list name information LN. The channel assignment information CHA is the channel number CN of a channel assigned to the play list PL whereas the list name information LN is the name of the play list PL. In the following description, the name of a play list PL is referred to as the list name of the play list PL. By the way, the list name of a play list PL also serves as the name of channel assigned to the play list PL. In addition, the list attribute information LAT of a play list PL also includes list-detail information LD, which is a text of a description concretely explaining the structure of the play list PL.

In addition, the list attribute information LAT of a play list PL also includes reproduction style information PM indicating the style of reproducing a plurality of audio data D1 registered on the play list PL. That is to say, the reproduction style information PM indicates whether the audio data D1 are to be reproduced in a reproduction order determined in advance or in another shuffle reproduction order obtained as a result of rearranging the original reproduction order determined in advance at random. By the way, the user is typically allowed to properly select one of the reproduction styles. On top of that, the list attribute information LAT of a play list PL also includes reproduction utilization setting information LS indicating whether or not the play list PL can be used in reproduction of audio data D1 registered on the play list PL. By the way, the user is typically allowed to properly and arbitrarily determine the existence or nonexistence of the application of the play list PL to reproduction of the audio data D1 registered on the play list PL by properly setting the value of the reproduction utilization setting information LS.

On the other hand, the track registration information TR stored on a play list PL is provided for each of audio data D1 registered on the play list PL. The track registration information TR stored on a play list PL as information provided for an audio data D1 registered on the play list PL includes reproduction setting information PS indicating the existence or nonexistence of reproduction of the audio data D1. By the way, the user is typically allowed to properly and arbitrarily determine the existence or nonexistence of production of any individual audio data D1 registered on a play list PL by properly setting the value of the reproduction setting information PS. In addition, the track registration information TR provided for an audio data D1 registered on a play list PL also includes the recording location of the audio data D1 as information MID. The recording location of the audio data D1 is a recording address of the content D1 in the recording medium 13. Thus, the audio data D1 can be reproduced by reading out the content D1 from the recording address in the recording medium 13. In the following description, the information MID also used for identifying the audio data D1 from all contents recorded on the recording medium 13 is referred to as content specification information.

By the way, in some cases, the musical characteristic of an audio data D1 recorded on the recording medium 13 is analyzed and, on the basis of the result of the analysis, the content D1 is registered on a certain play list PL having the structure described above. In addition, a play list PL can be created when the list-based reproduction function described before is activated. In this case, all audio data D1 recorded in the musical-content database MDB stored in the recording medium 13 are searched automatically for a predetermined number of most recently recorded audio data D1 each having a most recently recording date/time and the most recently recorded audio data D1 are then typically registered on the play list PL. In this way, audio data registered on the play list PL are updated every time the list-based reproduction function is activated.

Thus, the reproduction section 11 allows the user to select a desired play list PL as a channel among the play lists PL stored in the musical-content database MDB. Then, the reproduction section 11 sequentially reads out audio data D1 registered on the play list PL selected by the user in accordance with the play list PL and outputs each of the contents D1 as a reproduced content. Thus, the reproduction section 11 lets the user listen to a plurality of audio data D1 continuously. The audio data D1 include contents each giving a good impression to the user, contents each giving imagination close to good imagination to the user, contents sung by an artist serving as a favorite with the user and contents each pertaining to a genre also serving as a favorite with the user.

That is to say, when the user operates the operation section 12, that is, when the user operates the remote controller RM, in order to enter a command to select the list-based reproduction function, the reproduction section 11 activates the list-based reproduction function in accordance with the command. By the way, if the user operates the operation section 12 in order to enter a command to select the list-based reproduction function with the reproduction apparatus 10 put in a state of stopping the operation, the reproduction section 11 activates the reproduction apparatus 10, that is, the reproduction section 11 turns on the power supply of the reproduction apparatus 10, in accordance with the command. Then, as the reproduction section 11 activates the reproduction apparatus 10, the list-based reproduction function is invoked. In addition, when the user operates the operation section 12 in order to enter a command to select the list-based reproduction function with the reproduction apparatus 10 carrying out another function, the reproduction section 11 switches the reproduction apparatus 10 from the other function to the list-based reproduction function, activating the list-based reproduction function in accordance with the command.

By the way, every time the list-based reproduction function is ended, the reproduction section 11 sequentially updates the channel numbers CN of channels selected by the user and holds the updated channel numbers CN at the end of the list-based reproduction function, that is, upon completion of the list-based reproduction function. In addition, the reproduction section 11 also holds the channel number CN of a channel selected in advance as the first selected channel for the initial activation of the list-based reproduction function. At the initial activation of the list-based reproduction function, the reproduction section 11 is set to select a channel selected at the end of the list-based reproduction function or the channel selected in advance as the first selected channel for the initial activation of the list-based reproduction function.

To put it in detail, the reproduction section 11 selects the channel number CN of a channel selected at the end of the list-based reproduction function or the channel number CN of the channel selected in advance as the first selected channel for the initial activation of the list-based reproduction function and automatically takes the selected channel number CN as the channel number CN of a channel to be selected every time the list-based reproduction function is activated. In the following description, the channel number CN of a channel to be selected every time the list-based reproduction function is activated is referred to as an activation initially-used channel number CN. Thus, when the list-based reproduction function is activated, a channel indicated by the activation initially-used channel number CN is automatically selected. Then, the reproduction section 11 reads out the play list PL associated with the automatically selected channel from the recording medium 13 along with the channel list CL.

In this state, the reproduction section 11 reads out an audio data D1 registered on the play list PL and the content-related information DRE of the content D1 from the recording medium 13 in accordance with the content recording location information MID included in content registration information TR stored in the play list PL for the content D1. Then, the reproduction section 11 starts a content reproduction process from the characteristic position of the audio data D1 in accordance with the characteristic-position information SP included in the content-related information DRE and lets the user listen to the audio data reproduced by starting from the beginning of the characteristic portion of the content D1 on a trial basis.

If the user operates the operation section 12, that is, if the user operates the remote controller RM, in order to enter a channel switching command to change the presently selected channel to another one in the course of reproduction carried out to reproduce an audio data D1 included in the channel as reproduction started from the characteristic position of the content D1, that is, if the user enters the channel switching command in a period between the characteristic position and the end position of the audio data D1, the reproduction section 11 determines a new channel to be selected in accordance with the channel switching command on the basis of the channel number CN of the presently selected channel and a channel-number array included in the channel list CL as an array of channel numbers CN. Then, the reproduction section 11 reads out a play list PL associated with the new channel selected in accordance with the channel switching command from the recording medium 13 along with a new audio data D1 registered on the play list PL and the content-related information DRE of the new audio data D1 in accordance with the play list PL. Thus, the reproduction section 11 discontinues the reproduction of an audio data D1 being reproduced at the present point of time and starts reproduction of the new audio data D1 as reproduction starting from the characteristic position of the new audio data D1 in accordance with the characteristic-position information SP included in the content-related information DRE in the same way as what has been described above.

In this way, every time the user makes a request to change a channel to another one by entering a channel switching command, the reproduction section 11 starts reproduction of a new audio data D1 registered on a play list PL associated with a new channel selected in accordance with the channel switching command in conformity with the play list PL as reproduction starting from the characteristic position of the new audio data D1. Thus, the reproduction section 11 is capable of letting the user actually listen to music according to the audio data reproducible in accordance with the play list PL or the audio data D1 recorded on the recording medium 13, starting from the beginning of the characteristic position of the content D1 on a trial basis.

In addition, if the user operates the operation section 12, that is, if the user operates the remote controller RM, in order to enter a channel switching command to change the presently selected channel to another one in the course of reproduction carried out to reproduce an audio data D1 included in the channel as reproduction started from the characteristic position of the content D1, the reproduction section 11 reads out a play list PL associated with the new channel selected in accordance with the channel switching command from the recording medium 13 along with a new audio data D1 registered on the play list PL and the content-related information DRE of the new audio data D1 in accordance with the play list PL in the same way as what has been described above. Thus, the reproduction section 11 discontinues the reproduction of an audio data D1 being reproduced at the present point of time and starts reproduction of the new audio data D1 as reproduction starting from the characteristic position of the new audio data D1 in accordance with the characteristic-position information SP included in the content-related information DRE.

In this way, every time the user makes a request to change a channel to another one by entering a channel switching command, the reproduction section 11 starts reproduction of a new audio data D1 as reproduction starting from the characteristic position of the new audio data D1. Thus, the reproduction section 11 is capable of letting the user actually listen to music according to the audio data reproducible in accordance with the play list PL or the audio data D1 recorded on the recording medium 13, starting from the beginning of the characteristic portion of the content D1 on a trial basis. In addition, the reproduction section 11 is capable of letting the user select a desired audio data D1 from a plurality of audio data reproducible in accordance with the play list PL. That is to say, the reproduction section 11 is capable of letting the user search the audio data reproducible in accordance with the play list PL for a desired one.

In addition, if the user operates the operation section 12 in order to enter a content-selection confirmation command for confirming the selection of audio data reproduced on a trial basis as a desired audio data D1 in the course of reproduction started from the characteristic position of the audio data D1 as reproduction of the audio data D1, the reproduction section 11 once discontinues the reproduction of the audio data D1 at that point of time, that is, the reproduction section 11 once discontinues the reproduction started from the characteristic position of the audio data D1 as the reproduction of the audio data D1, and newly starts reproduction of the desired audio data D1 from the beginning of the desired audio data D1. In this way, the reproduction section 11 is capable of letting the user listen to the entire music according to the desired audio data D1 in accordance with selection of the desired audio data D1 when the user selects the desired audio data D1.

When the reproduction carried out on the audio data D1 as reproduction starting from the beginning of the audio data D1 is completed, that is, when the reproduction carried out on the audio data D1 as reproduction starting from the beginning of the audio data D1 and ending at the tail of the content D1 is completed, the reproduction section 11 reads out a new audio data D1 according to the presently selected play list PL and the content-related information DRE of the content D1 from the recording medium 13. Then, as an audio data D1 following the audio data D1, the reproduction of which has been completed at this point of time, the reproduction section 11 commences reproduction of the new audio data D1 from the position of the beginning of the new audio data D1. If the user does not enter any a command serving as a request to change the channel to another one or a request to change the audio data D1 to another one in the course of the reproduction carried out on the audio data D1 as reproduction starting from the characteristic position of the audio data D1 and the reproduction carried out on the audio data D1 as reproduction starting from the characteristic position of the audio data D1 and ending at the tail of the audio data D1 is completed, upon completion of the reproduction carried out on the audio data D1, the reproduction section 11 reads out a new audio data D1 according to the presently selected play list PL and the content-related information DRE of the content D1 from the recording medium 13. Then, as an audio data D1 following the audio data D1, the reproduction of which has been completed at this point of time, the reproduction section 11 commences reproduction of the new audio data D1 from the position of the beginning of the new audio data D1.

In this way, when reproduction carried out on the audio data D1 as reproduction starting from the characteristic position of the audio data D1 and ending at the tail of the audio data D1 is completed, the reproduction section 11 assumes that the user has made a request to listen to a plurality of pieces of music according to a plurality of audio data D1 registered on the presently selected play list PL. Thus, the reproduction section 11 sequentially reproduces all the audio data D1 in accordance with the presently selected play list PL and is capable of letting the user listen to all the pieces of music continuously. By the way, let us assume that the reproduction section 11 sequentially reproduces audio data D1 in accordance with a play list PL by starting each of the reproductions from the start or characteristic position of one of the audio data D1. In this case, a plurality of pieces of content-related information TR are put in the shape of a ring as if the last audio data D1 were linked back to the first audio data D1 to form an array according to one of a prescribed-order reproduction way and a shuffle reproduction way, which are obtained by rearranging the pieces of content-related information TR. Thus, the reproduction section 11 is capable of cyclically reproducing a plurality of audio data D1 registered on a play list PL.

If the user operates the operation section 12, that is, if the user operates the remote controller RM, in order to enter a content switching command to change the presently reproduced audio data D1 to another one in the course of reproduction carried out to reproduce the audio datan audio data D1 as reproduction started from the starting position of the content D1, that is, in the course of reproduction carried out to reproduce the audio datan audio data D1 as reproduction started from the starting position of the content D1 and ended at the tail of the content D1, the reproduction section 11 reads out a new audio data D1 according to the presently selected play list PL and the content-related information DRE of the content D1 from the recording medium 13 in the same way as what has been described above. Then, the reproduction section 11 once discontinues the reproduction of the present audio data D1 at that point of time and starts reproduction of the new audio data D1 from the characteristic position of the new audio data D1 in accordance with the characteristic-position information SP included in the content-related information DRE. In this way, even if the reproduction section 11 reproduces an audio data D1 selected by the user, if the user makes a request to search for a newly desired audio data D1, the reproduction of the present audio data D1 is discontinued. Then, the reproduction section 11 lets the user actually listen to the newly desired audio data reproduced from the beginning of the characteristic portion of the audio data D1 in accordance with the presently selected play list PL on a trial basis in the same way as what has been described earlier. In addition, the reproduction section 11 is capable of letting the user newly select a desired audio data D1 from a plurality of audio data reproducible in accordance with the play list PL. That is to say, the reproduction section 11 is capable of letting the user search the audio data reproducible in accordance with the play list PL for a desired one.

In addition, if the user operates the operation section 12, that is, if the user operates the remote controller RM, in order to enter a channel switching command to change the presently selected channel to another one in the course of reproduction carried out to reproduce an audio data D1 included in the channel as reproduction started from the start position of the content D1, the reproduction section 11 determines a new channel to be selected in accordance with the channel switching command on the basis of the channel number CN of the presently selected channel and a channel-number array included in the channel list CL as an array of channel numbers CN. Then, the reproduction section 11 reads out a play list PL associated with the new channel selected in accordance with the channel switching command from the recording medium 13 along with a new audio data D1 registered on the play list PL and the content-related information DRE of the new audio data D1 in accordance with the play list PL in the same way as what has been described above. Thus, the reproduction section 11 discontinues the reproduction of an audio data D1 being reproduced at the present point of time and starts reproduction of the new audio data D1 as reproduction starting from the characteristic position of the new audio data D1 in accordance with the characteristic-position information SP included in the content-related information DRE in the same way as what has been described before.

In this way, even if a plurality of audio data D1 are being reproduced in accordance with a play list PL selected by the user, if the user enters a channel switching command to change the play list PL used in the reproduction of the audio data D1 to another one, the reproduction section 11 discontinues the reproduction in accordance with the command. Then, in the same way as what has been described before, the reproduction section 11 lets the user actually listen to the newly desired audio data reproduced from the beginning of the characteristic portion of the audio data D1 in accordance with a new play list PL different from the presently selected play list PL used in the reproduction of the previous audio data reproduced so far on a trial basis. Subsequently, the reproduction section 11 lets the user select the new play list PL to be used in reproduction of newly desired audio data D1.

By the way, when the list-based reproduction function is activated, the reproduction section 11 supplies a channel list CL read out from the recording medium 13 to the display processing section 16. In addition, every time the reproduction section 11 reads out a play list PL from the recording medium 13, the reproduction section 11 also outputs the list attribute information LAT stored in the play list PL to the display processing section 16. On the top of that, every time the reproduction section 11 reads out content-related information DRE along with an audio data D1 associated with the information DRE from the recording medium 13, the reproduction section 11 also outputs the content attribute information DAT included in the information DRE to the display processing section 16.

Figure 5:
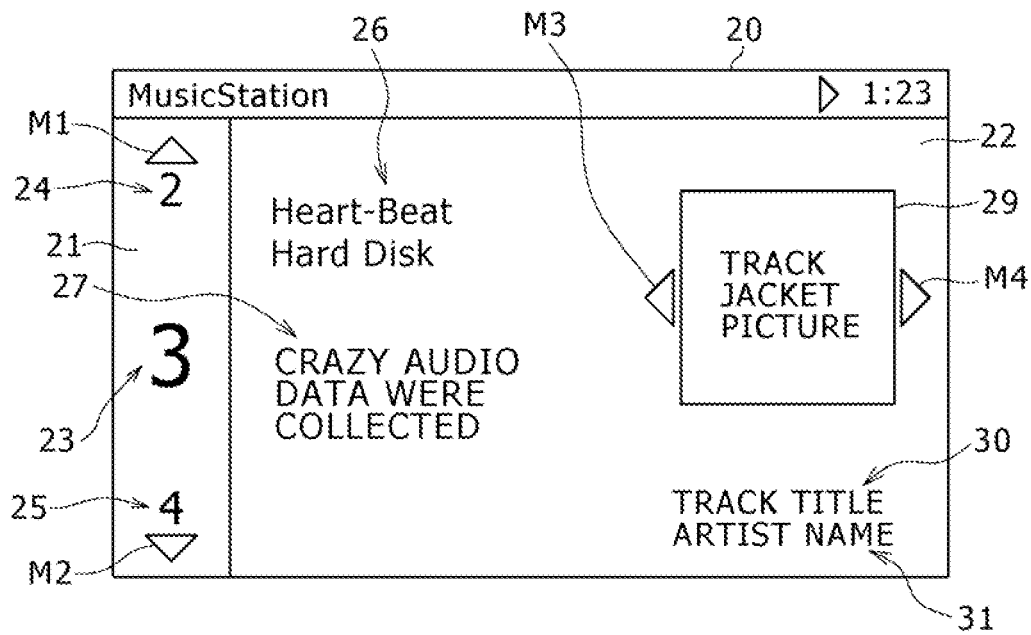
FIG. 5 is a diagram roughly showing the configuration of a selection screen.

Thus, following the activation of the list-based reproduction function, the display processing section 16 generates data of a selection screen used for selecting a channel and an audio data D1 on the basis of the channel list CL, the list attribute information LAT and the content attribute information DAT. Then, the display processing section 16 outputs the data of the selection screen to the display section 17 in order to display a selection screen 20 like one shown in FIG. 5 on the display section 17 as a screen based on the selection-screen data.

In this case, on the left side of the selection screen 20, a long channel selection area 21 oriented in the vertical direction is set and, on the remaining right side of the selection screen 20, a musical-content selection area 22 is set. At the center of the channel selection area 21, a displayer 23 for notifying the user of the channel number CN of a presently selected channel is provided. In the following description, the displayer 23 is referred to as a selected-channel notification icon 23. On the upper and lower sides of the channel selection area 21, displayers 24 and 25 are provided respectively. In the following description, the displayers 24 and 25 are each referred to as a selectable-channel notification icon for notifying the user of a channel number CN that can be used to replace the channel number CN displayed as the selected-channel notification icon 23. As will be described later, the selectable-channel notification icons 24 and 25 can be each changed to another channel number CN included in an array of channel numbers CN stored in the channel list CL.

At a position above the selectable-channel notification icon 24 displayed in the channel selection area 21, a first mark M1 having the shape of a triangle with its vertex oriented typically in the upward direction is provided. By the way, the remote controller RM includes the upward-direction selection button RME having the same shape and the same orientation as the first mark M1 provided in the channel selection area 21. If the upward-direction selection button RME is operated by being pressed down, at that time, the channel number CN presently displayed as the selected-channel notification icon 23 in the channel selection area 21 on the selection screen 20 is replaced with a channel number CN typically smaller than the channel number CN presently displayed as the selected-channel notification icon 23 by a difference of one in accordance with an array of channel numbers CN stored in the channel list CL. The channel number CN typically smaller than the channel number CN presently displayed as the selected-channel notification icon 23 by a difference of one is the channel number CN displayed as the selectable-channel notification icon 24. Thus, the user is capable of intuitively recognizing the desired channel to be used as a replacement of the presently selected channel.

By the same token, at a position beneath the selectable-channel notification icon 25 displayed in the channel selection area 21, a second mark M2 having the shape of a triangle with its vertex oriented typically in the downward direction is provided. By the way, the remote controller RM includes the downward-direction selection button RMF having the same shape and the same orientation as the second mark M2 provided in the channel selection area 21. If the downward-direction selection button RMF is operated by being pressed down, at that time, the channel number CN presently displayed as the selected-channel notification icon 23 in the channel selection area 21 on the selection screen 20 is replaced with a channel number CN typically greater than the channel number CN presently displayed as the selected-channel notification icon 23 by a difference of one in accordance with an array of channel numbers CN stored in the channel list CL. The channel number CN typically greater than the channel number CN presently displayed as the selected-channel notification icon 23 by a difference of one is the channel number CN displayed as the selectable-channel notification icon 25. Thus, the user is capable of intuitively recognizing the desired channel to be used as a replacement of the presently selected channel.

Let us assume for example that, in the reproduction apparatus 10, a play list PL associated with a channel has been set as a play list with its audio data D1 not to be utilized in reproduction. In this case, the channel number CN of the channel associated with the play list PL is not to be selected in the operation to replace a channel number CN with another one as described above. To put it concretely, in the channel selection area 21 on the selection screen 20, the channel number CN of the channel associated with the play list PL with its audio data D1 not to be utilized in reproduction is not displayed as the selected-channel notification icon 23 indicating the channel number CN of the presently selected channel or as the selectable-channel notification icon 24 or 25 indicating the channel number CN of a replacement channel.

Thus, when the upward-direction selection button RME is operated by being pressed down, the channel number CN presently displayed as the selected-channel notification icon 23 in the channel selection area 21 on the selection screen 20 is replaced with a channel number CN smaller than the channel number CN presently displayed as the selected-channel notification icon 23 by at least a difference of one, but the channel number CN of the channel associated with the play list PL with its audio data D1 not to be utilized in reproduction is not displayed as the selected-channel notification icon 23 indicating the channel number CN of the presently selected channel or as the selectable-channel notification icon 24 or 25 indicating the channel number CN of a replacement channel in order to allow the user to recognize that a desired channel can be selected as the replacement channel. In this case, the channel number CN smaller than the channel number CN presently displayed as the selected-channel notification icon 23 by at least a difference of one is the channel number displayed as the selectable-channel notification icon 24. By the same token, when the downward-direction selection button RMF is operated by being pressed down, the channel number CN presently displayed as the selected-channel notification icon 23 in the channel selection area 21 on the selection screen 20 is replaced with a channel number CN greater than the channel number CN presently displayed as the selected-channel notification icon 23 by at least a difference of one, but the channel number CN of the channel associated with the play list PL with its audio data D1 not to be utilized in reproduction is not displayed as the selected-channel notification icon 23 indicating the channel number CN of the presently selected channel or as the selectable-channel notification icon 24 or 25 indicating the channel number CN of a replacement channel in order to allow the user to recognize that a desired channel can be selected as the replacement channel. In this case, the channel number CN greater than the channel number CN presently displayed as the selected-channel notification icon 23 by at least a difference of one is the channel number displayed as the selectable-channel notification icon 25.

On the left side of the musical-content selection area 22, there are displayed the list name 26 of a play list PL associated with the presently selected channel and an explanatory text 27 for concretely describing the structure of the play list PL. As described earlier, the explanatory text 27 is the list-detail information LD. On the right side of the musical-content selection area 22, there is displayed information on an audio data D1 presently being reproduced. The information on an audio data D1 presently being reproduced includes a jacket picture image 29 on the upper side as well as a musical-content title 30 and an artist name 31, which are displayed on the lower side beneath the jacket picture image 29.

In addition, on the left side of the jacket picture image 29 displayed in the musical-content selection area 22, there is displayed a third mark M3 having the shape of a triangle with its vertex oriented typically in the direction toward the left side. By the way, the left-direction selection button RMG in the remote controller RM has the same shape and the same orientation as the third mark M3 in the musical-content selection area 22. If the left-direction selection button RMG is operated by being pressed down, for example, the audio data D1 to be reproduced can be replaced with an immediately preceding audio data D1 in accordance with the presently selected play list PL at that time, and the user is allowed to intuitively recognize the operation to replace the audio data D1.

By the same token, on the right side of the jacket picture image 29 displayed in the musical-content selection area 22, there is displayed a fourth mark M4 having the shape of a triangle with its vertex oriented typically in the direction toward the right side. By the way, the right-direction selection button RMH in the remote controller RM has the same shape and the same orientation as the fourth mark M4 in the musical-content selection area 22. If the right-direction selection button RMH is operated by being pressed down, for example, the audio data D1 to be reproduced can be replaced with an immediately succeeding audio data D1 in accordance with the presently selected play list PL at that time, and the user is allowed to intuitively recognize the operation to replace the audio data D1.

By the way, a channel is changed to another one indicated by a channel number CN separated from the channel number CN of the channel in a direction along the array of channel numbers CN stored on the channel list CL. Thus, when either of the upward-direction selection button RME and the downward-direction selection button RMF, which are provided on the remote controller RM, is operated by being pressed down in order to enter a channel switching command to change the channel to another one with the selection screen 20 displayed by the display processing section 16 on the display section 17, the reproduction section 11 determines a channel to be used as a replacement in accordance with the channel switching command on the basis of the channel list CL, the channel number CN of the presently selected channel and the switching direction according to the operated upward-direction selection button RME or the operated downward-direction selection button RMF. By the way, if the reproduction section 11 handles a plurality of channel numbers CN stored on the channel list CL in a way as if a ring connecting the last channel number CN to the first channel number CN were created in this case, the channel is replaced with another in a cyclical manner.

Then, the reproduction section 11 reads out a new play list PL according to the determined channel and content-related information DRE from the recording medium 13. Subsequently, the reproduction section 11 supplies list attribute information LAT included in included in the play list PL and content attribute information DAT included in the content-related information DRE to the display processing section 16. On the basis of the list attribute information LAT and the content attribute information DAT, which are received from the reproduction section 11, the display processing section 16 changes the display contents of the channel selection area 21 and the musical-content selection area 22, which appear on the selection screen 20 displayed on the display section 17. In this way, by letting the user actually listen to music according to audio data D1 each reproduced from the beginning of the characteristic portion of the audio data D1 in accordance with the presently selected play list PL on a trial basis, the reproduction section 11 also allows the user to visually confirm information displayed on the selection screen 20 in a process to select a desired play list PL to be used in reproduction of audio data D1. In this case, the information displayed on the selection screen 20 includes the selected-channel notification icon 23 and the list name 26.

By the same token, an audio data D1 to be reproduced is changed to another one in a direction according to an order of reproduction of audio data D1 registered on a play list PL. Thus, when either of the left-direction selection button RMG and the right-direction selection button RMH, which are provided on the remote controller RM, is operated by being pressed down in order to enter a content switching command to change an audio data D1 to another one with the selection screen 20 displayed by the display processing section 16 on the display section 17, the reproduction section 11 determines an audio data D1 to be used as a replacement in accordance with the content switching command on the basis of a reproduction order prescribed in a play list PL as the order of reproduction of audio data D1 registered on the play list PL and the switching direction according to the operated left-direction selection button RMG or the operated right-direction selection button RMH. In this case, the order of reproduction of audio data D1 registered on the play list PL is either of a prescribed-sequence reproduction order or a random reproduction order. By the way, if the reproduction section 11 handles a plurality of pieces of content recording location information MID for a plurality of audio data D1 with their reproduction order prescribed on the play list PL in a way as if a ring connecting the last piece of content recording location information MID to the first piece of content recording location information MID were created in this case, the musical channel D1 is replaced with another in a cyclical manner.

The reproduction section 11 newly reads out content-related information DRE for the determined audio data D1 from the recording medium 13. Then, the reproduction section 11 supplies content attribute information DAT included in the content-related information DRE to the display processing section 16. On the basis of the content attribute information DAT received from the reproduction section 11, the display processing section 16 updates information displayed by the display section 17 on the selection screen 20. In this case, the information displayed by the display section 17 on the selection screen 20 is the jacket picture image 29, the musical-content title 30 and the artist name 31. In this way, by letting the user actually listen to music according to audio data reproduced from the beginning of the characteristic portion of the audio data D1 on a trial basis, the reproduction section 11 also allows the user to visually confirm the information displayed on the selection screen 20 in a process to select a desired audio data D1. As described above, the information displayed by the display section 17 on the selection screen 20 is the jacket picture image 29, the musical-content title 30 and the artist name 31.

Figure 6:
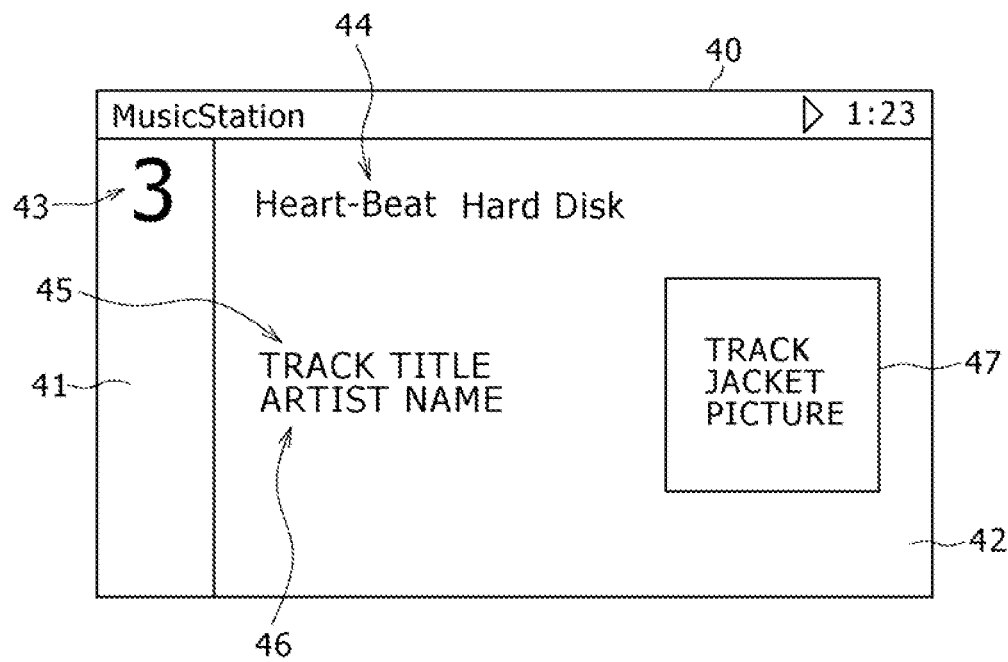
FIG. 6 is a diagram roughly showing the configuration of a content reproduction screen.

When the confirmation button RMI provided on the remote controller RM is operated by being pressed down in order to enter a content-selection confirmation command with the selection screen 20 displayed by the display processing section 16 on the display section 17, the confirmation of the selection of the audio data D1 is reported to the display processing section 16. At that time, on the basis of the list attribute information LAT and the content attribute information DAT, which have been received from the reproduction section 11, the display processing section 16 generates data of a reproduction screen used for notifying the user of an audio data D1 currently being reproduced. The list attribute information LAT is list attribute information LAT stored in a play list PL selected at this point of time whereas the content attribute information DAT is content attribute information DAT associated with an audio data reproduced at this point of time. Then, the display processing section 16 outputs the data of the reproduction screen to the display section 17. In this way, the display processing section 16 displays a content reproduction screen 40 like the one shown in FIG. 6 on the display section 17 on the basis of the generated data of a reproduction screen in place of the selection screen 20.

In this case, on the left side of the content reproduction screen 40, a long channel selection area 41 oriented in the vertical direction is set and, on the remaining right side of the content reproduction screen 40, a reproduced-content notification area 42 is set. On the top of the channel selection area 41, a displayer 43 for notifying the user of the channel number CN of a presently selected channel is provided. In the following description, the displayer 43 is referred to as a selected-channel notification icon 43.

On the left side of the reproduced-content notification area 42, there are displayed the list name 44 of a play list PL associated with the presently selected channel. On the right side of the reproduced-content notification area 42, there is displayed a jacket picture image 47. The track title 45, the artist name 46 and the jacket picture image 47 are pieces of information on the audio data D1 presently being reproduced.

When an audio data D1 being reproduced in accordance with a presently selected play list PL is changed to another one with the content reproduction screen 40 displayed on the display section 17, that is, when the present audio data D1 has been reproduced till the position of the end thereof and changed to a new audio data D1 to be reproduced from the position of the start thereof, the display processing section 16 updates the display contents of the reproduced-content notification area 42 on the content reproduction screen 40 on the basis of the new content attribute information DAT received from the reproduction section 11. In this way, the display processing section 16 is capable of letting the user confirm information on the new audio data D1 and the play list PL used in the reproduction of the audio data D1 with ease. The information on the new audio data D1 includes the track title 45 and the artist name 46, which are associated with the audio data D1.

By the way, every time reproduction of an audio data D1 is started from the characteristic position of the audio data D1, the reproduction section 11 once resets an internal timer in order to measure the lapsing reproduction time period of the audio data D1. If the user does not enter a command through the operation section 12 before the lapsing reproduction time period of the audio data D1 reaches a predetermined time period selected in advance since the start of the reproduction from the characteristic position, at a point of time the lapsing reproduction time period of the audio data D1 reaches the predetermined time period, the reproduction section 11 notifies the display processing section 16 that the audio data D1 has been reproduced for the predetermined time period since the start of the reproduction from the characteristic position. When the display processing section 16 is notified by the reproduction section 11 that the audio data D1 has been reproduced for the predetermined time period since the start of the reproduction from the characteristic position, the display processing section 16 automatically changes the selection screen 20 displayed so far on the selection screen 20 to the content reproduction screen 40. The predetermined time period is shorter than the length of the time it takes to reproduce the audio data D1 from the characteristic position thereof to the end position thereof.

When the reproduction section 11 supplies new list attribute information LAT and new content attribute information DAT to the display processing section 16 in accordance with a command entered by the user to change a channel to another one with the content reproduction screen 40 displayed on the display section 17, the display processing section 16 generates data of a selection screen on the basis of the new list attribute information LAT and the new content attribute information DAT. Then, the display processing section 16 changes the content reproduction screen 40 displayed on the display section 17 back to a selection screen 20. By the same token, when the reproduction section 11 supplies new content attribute information DAT to the display processing section 16 in accordance with a command entered by the user to change an audio data D1 to another one with the content reproduction screen 40 displayed on the display section 17, the display processing section 16 generates data of a selection screen on the basis of the new content attribute information DAT. Then, the display processing section 16 changes the content reproduction screen 40 displayed on the display section 17 back to a selection screen 20.

Figure 7:
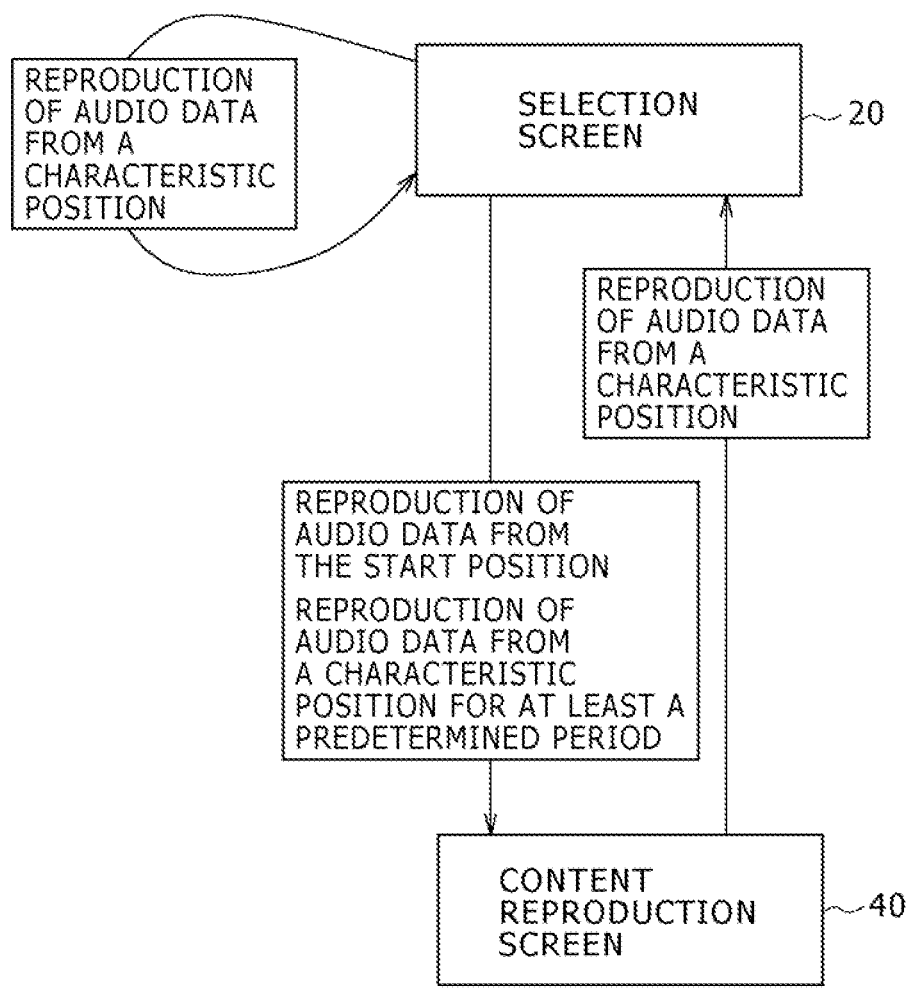
FIG. 7 is a rough explanatory diagram to be referred to in description of a process to switch a display screen from the selection screen to the content reproduction screen and vice versa in execution of a list-based reproduction function.

That is to say, when the list-based reproduction function is activated, the display processing section 16 displays the selection screen 20 on the display section 17 as shown in FIG. 7. When the reproduction section 11 reproduces a new audio data D1 by starting the reproduction from the characteristic position thereof in accordance with a command entered by the user to change a channel or an audio data D1 to another one in this state, the display processing section 16 updates the display contents of the selection screen 20 in accordance with the new audio data reproduced by starting from the characteristic position thereof. With the selection screen 20 displayed on the display section 17, when the display processing section 16 is notified of the fact that the reproduction section 11 has been reproducing the new audio data D1 by starting the reproduction from the characteristic position thereof for a time period determined in advance and the fact that the selection of the audio data D1 being reproduced as a desired audio data D1 has been confirmed, the display processing section 16 changes the selection screen 20 displayed on the display section 17 so far to the content reproduction screen 40.

When the reproduction section 11 reproduces an audio data D1 by commencing from the start position of the content D1 with the content reproduction screen 40 displayed on the display section 17, the display processing section 16 updates the display contents of the content reproduction screen 40 in accordance with the audio data reproduced by commencing from the start position thereof.

By the way, if the reproduction section 11 reproduces an audio data D1 by commencing from the characteristic position in accordance with a command entered by the user to change a channel or an audio data D1 to another one with the content reproduction screen 40 displayed on the display section 17, the display processing section 16 changes the content reproduction screen 40 displayed so far on the display section 17 to the selection screen 20. For example, when the audio data D1 or the channel is changed to another one as described above, the display processing section 16 updates the display contents of the selection screen 20 or content reproduction screen 40 appearing on the display section 17 or changes the selection screen 20 appearing on the display section 17 to the content reproduction screen 40 or vice versa. In this way, the display processing section 16 is capable of notifying the user of a selected channel representing a selected play list PL and a reproduced audio data D1 through the selection screen 20 and/or the content reproduction screen 40.

Figure 8:
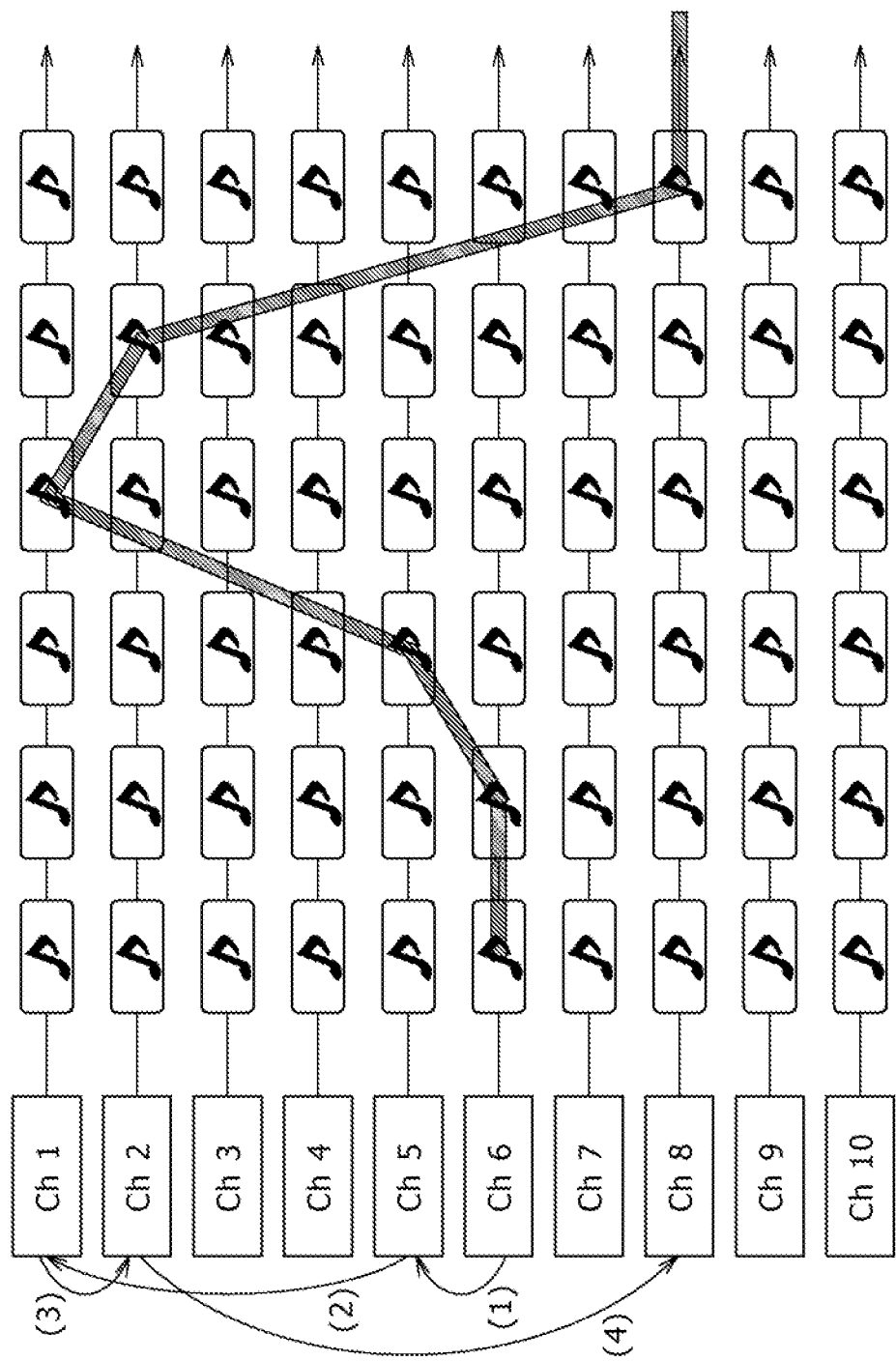
FIG. 8 is a rough explanatory diagram to be referred to in description of a process to change a play list used in reproduction of contents to another.

As shown in FIG. 8, while the list-based reproduction function is being carried out, the reproduction section 11 is capable of allowing the user to select a desired channel with ease in order to properly change a play list PL to another one in the same sense as a sense, which is felt by the user when the user changes a channel in order to select a radio broadcasting station while the user is listening to a radio broadcast. While the user is selecting a desired channel in order to properly change a play list PL to another one, the reproduction section 11 is sequentially reproducing audio data D1 by commencing from the start or characteristic position thereof without being interrupted by the operation carried out by the user to select a desired channel. Thus, the user is allowed to listen to more pieces of music.

By the way, if the user operates either of the upward-direction selection button RME or the downward-direction selection button RMF, which are provided on the remote controller RM, by pressing down the button continuously at a relatively high channel-changing speed, the reproduction section 11 deliberately ignores selection of another channel existing between a channel selected at a point of time the continuous operation to press down the button is started and a channel that will be selected when the channel-changing speed of the continuous operation carried out to press down the button is reduced to a certain degree. Thus, the reproduction section 11 prevents a plurality of different audio data D1 from being heard by the user as noises generated during the continuous operation carried out to press down the button. Such noises are caused by the different audio data D1 generated at intervals shifted slightly from each other in accordance with play lists PL each associated with one of a plurality of channels selected during a period between the point of time the continuous operation to press down the button is started at a relatively high channel-changing speed and a point of time the channel-changing speed of the continuous operation carried out to press down the button is reduced to a certain degree.

Figure 9:
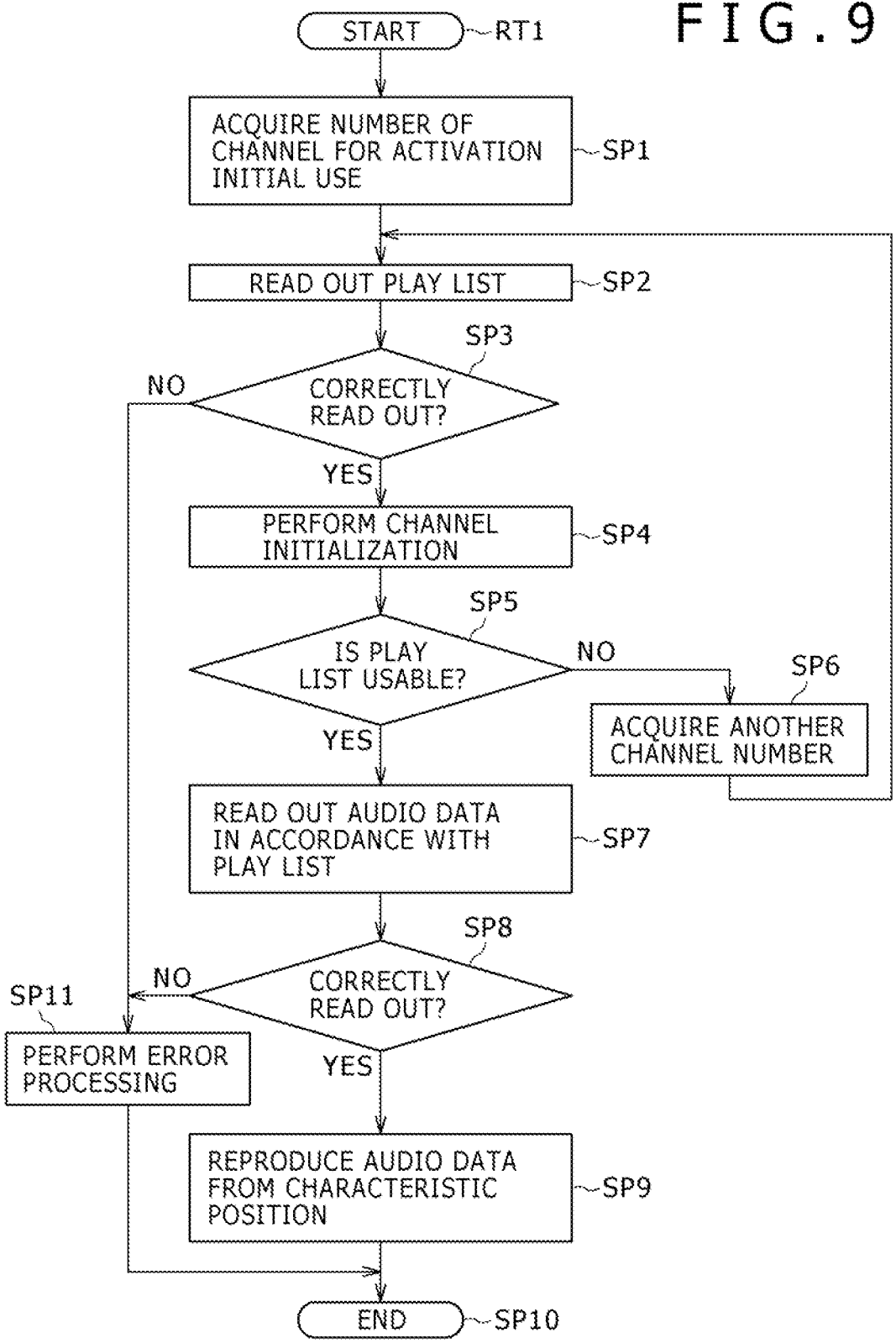
FIG. 9 shows a flowchart representing the procedure of processing to activate the list-based reproduction function.

In actuality, when the list-based reproduction function is activated in accordance with a command entered by the user through the operation section 12, the reproduction section 11 starts a procedure RT1 represented by a flowchart shown in FIG. 9 as the procedure of processing to activate the list-based reproduction function. As shown in the figure, the flowchart begins with a step SP1 at which the reproduction section 11 acquires a channel number CN for activation initial use. Then, the flow of the processing procedure RT1 goes on to a step SP2. At the step SP2, the reproduction section 11 reads out a channel list CL from the recording medium 13. The reproduction section 11 also reads out a play list PL indicated by the channel number CN of a channel assigned to the play list PL for activation initial use from the recording medium 13. Then, the flow of the processing procedure RT1 goes on to a step SP3.

At the step SP3, the reproduction section 11 produces a result of determination as to whether or not the play list PL has been correctly read out from the recording medium 13. If the determination result produced in the process carried out at the step SP3 is an affirmation, the result of the determination is typically interpreted as a determination result indicating that the data of the play list PL is not damaged data. Thus, if the determination result produced in the process carried out at the step SP3 is an affirmation, the reproduction section 11 continues the processing procedure RT1 to a step SP4. At the step SP4, the reproduction section 11 carries out a channel initialization process by making use of the play list PL. Let us assume for example that the reproduction style information PM included in the list attribute information LAT of the play list PL indicates the shuffle style of reproducing a plurality of audio data D1 registered on the play list PL. In this case, the reproduction section 11 carries out the channel initialization process by rearranging the audio data D1 in a random manner to create another reproduction order different from the original reproduction order prescribed in the play list PL. Then, after carrying out the channel initialization process, the reproduction section 11 continues the processing procedure RT1 to a step SP5.

At the step SP5, on the basis of the reproduction utilization setting information LS included in the list attribute information LAT of the new play list PL obtained as a result of the channel initialization process, the reproduction section 11 produces a result of determination as to whether or not the play list PL has been set as a play list to be used in reproduction of audio data D1. If the determination result produced in the process carried out at the step SP5 is a negation, the result of the determination is interpreted as a determination result indicating that the play list PL has been set as a play list not to be used in reproduction of audio data D1. Thus, if the determination result produced in the process carried out at the step SP5 is a negation, the reproduction section 11 continues the processing procedure RT1 to a step SP6.

A plurality of channels include a channel unchangeably assigned to a play list PL, which is set as a play list to be used in reproduction of audio data D1 and as a play list with such setting unchangeable. In the following description, a play list PL set as a play list PL to be used in reproduction of audio data D1 and as a play list with such setting unchangeable is referred to as an unchangeably set usable play list PL. Thus, at the step SP6, the reproduction section 11 acquires the channel number of another channel assigned to an unchangeably set usable play list PL. Then, the flow of the processing procedure RT1 goes back to the step SP2. At the step SP2, the reproduction section 11 again reads out a play list PL indicated by the channel number CN from the recording medium 13 and again carries out the processes at the subsequent steps following the step SP2.

If the determination result produced in the process carried out at the step SP5 is an affirmation, on the other hand, the result of the determination is interpreted as a determination result indicating that the play list PL has been set as a play list to be used in reproduction of audio data D1. Thus, if the determination result produced in the process carried out at the step SP5 is an affirmation, the reproduction section 11 continues the processing procedure RT1 to a step SP7. At the step SP7, the reproduction section 11 reads out the first audio data D1 in the reproduction order according to the play list PL from the recording medium 13. Then, the reproduction section 11 continues the processing procedure RT1 to a step SP8.

At the step SP8, the reproduction section 11 produces a result of determination as to whether or not the audio data D1 has been correctly read out from the recording medium 13. If the determination result produced in the process carried out at the step SP8 is an affirmation, the result of the determination is typically interpreted as a determination result indicating that the data of the audio data D1 read out from the recording medium 13 is not damaged data. Thus, if the determination result produced in the process carried out at the step SP8 is an affirmation, the reproduction section 11 continues the processing procedure RT1 to a step SP9. At the step SP9, the reproduction section 11 requests the display processing section 16 to display the selection screen 20 on the display section 17 and starts reproduction of the audio data D1 from the characteristic position of the audio data D1. Finally, the reproduction section 11 ends the procedure RT1 of the processing to activate the list-based reproduction function at a step SP10. The reproduction section 11 activates the list-based reproduction function as described above.

By the way, if the determination result produced in the process carried out at the step SP3 is a negation, the result of the determination is typically interpreted as a determination result indicating that the data of the play list PL is damaged data. Thus, if the determination result produced in the process carried out at the step SP3 is a negation, the reproduction section 11 continues the processing procedure RT1 to a step SP11. By the same token, if the determination result produced in the process carried out at the step SP8 is a negation, on the other hand, the result of the determination is typically interpreted as a determination result indicating that the data of the audio data D1 read out from the recording medium 13 is damaged data. Thus, if the determination result produced in the process carried out at the step SP8 is a negation, the reproduction section 11 also continues the processing procedure RT1 to the step SP11. At the step SP11, the reproduction section 11 carries out error processing by, for example, notifying the user that the audio data D1 cannot be reproduced. Finally, the reproduction section 11 ends the procedure RT1 of the processing to activate the list-based reproduction function at the step SP10.

Figure 10:
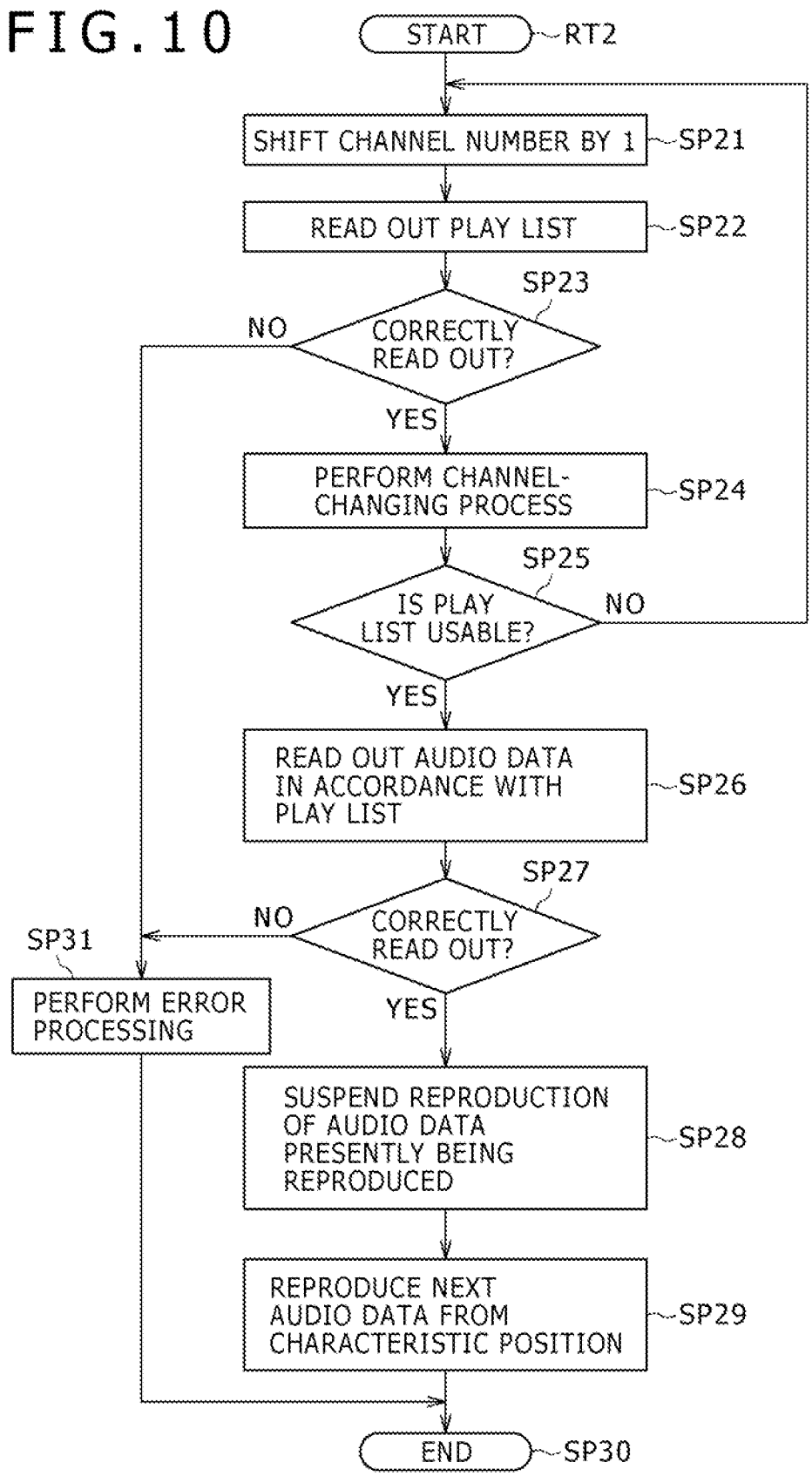
FIG. 10 shows a flowchart representing the procedure of processing to change a channel of content reproduction to another.

The following description explains a channel switching process carried out in the course of the execution of the list-based reproduction function. Let us assume that the user operates the operation section 12 in order to enter a command to change a channel to another one in the course of the execution of the list-based reproduction function. In this case, the reproduction section 11 starts a procedure RT2 represented by a flowchart shown in FIG. 10 as the procedure of processing to change a channel to another one. As shown in the figure, the flowchart representing the processing procedure RT2 begins with a step SP21 at which the reproduction section 11 increments or decrements the channel number CN of the presently selected channel by 1 in accordance with an array of channel numbers CN registered on the channel list CL and in accordance with a changing direction specified by the user as the changing direction of the channel number CN. The reproduction section 11 takes the result of the channel-number incrementing or decrementing process as a new channel number CN. Then, the reproduction section 11 continues the processing procedure RT2 to a step SP22. At the step SP22, the reproduction section 11 reads out a play list PL associated with a channel indicated by the new channel number CN from the recording medium 13. Then, the reproduction section 11 continues the processing procedure RT2 to a step SP23.

At the step SP23, the reproduction section 11 produces a result of determination as to whether or not the play list PL has been correctly read out from the recording medium 13. If the determination result produced in the process carried out at the step SP23 is an affirmation, the result of the determination is typically interpreted as a determination result indicating that the data of the play list PL read out from the recording medium 13 is not damaged data. Thus, if the determination result produced in the process carried out at the step SP8 is an affirmation, the reproduction section 11 continues the processing procedure RT2 to a step SP24. At the step SP24, the reproduction section 11 carries out a process to change a channel.

Let us assume for example that the reproduction style information PM included in the list attribute information LAT of the play list PL indicates the shuffle style of reproducing a plurality of audio data D1 registered on the play list PL. In this case, at the step SP24, the reproduction section 11 carries out the process to change a channel by rearranging the audio data D1 in a random manner to create another reproduction order different from the original reproduction order prescribed in the play list PL. Then, after carrying out the channel changing process, the reproduction section 11 continues the processing procedure RT2 to a step SP25.

At the step SP25, on the basis of the reproduction utilization setting information LS included in the list attribute information LAT of the play list PL obtained as a result of the process to change a channel, the reproduction section 11 produces a result of determination as to whether or not the play list PL has been set as a play list to be used in reproduction of audio data D1. If the determination result produced in the process carried out at the step SP25 is a negation, the result of the determination is interpreted as a determination result indicating that the play list PL has been set as a play list not to be used in reproduction of audio data D1. Thus, if the determination result produced in the process carried out at the step SP25 is a negation, the flow of the processing procedure RT2 goes back to the step SP21. At the step SP21, the reproduction section 11 further increments or decrements the channel number CN of the presently selected channel by 1 in accordance with an array of channel numbers CN registered on the channel list CL and in accordance with a changing direction specified by the user as the changing direction of the channel number CN. The reproduction section 11 takes the result of the process to increment or decrement the channel number CN as a new channel number CN. Then, the reproduction section 11 again carries out the processes at the subsequent steps following the step SP21.

If the determination result produced in the process carried out at the step SP25 is an affirmation, on the other hand, the result of the determination is interpreted as a determination result indicating that the play list PL has been set as a play list to be used in reproduction of audio data D1. Thus, if the determination result produced in the process carried out at the step SP25 is an affirmation, the reproduction section 11 continues the processing procedure RT2 to a step SP26. At the step SP26, the reproduction section 11 reads out the first audio data D1 in the reproduction order according to the play list PL from the recording medium 13. Then, the reproduction section 11 continues the processing procedure RT2 to a step SP27. At the step SP27, the reproduction section 11 produces a result of determination as to whether or not the audio data D1 has been correctly read out from the recording medium 13. If the determination result produced in the process carried out at the step SP27 is an affirmation, the result of the determination is typically interpreted as a determination result indicating that the data of the audio data D1 read out from the recording medium 13 is not damaged data. Thus, if the determination result produced in the process carried out at the step SP27 is an affirmation, the reproduction section 11 continues the processing procedure RT2 to a step SP28.

At the step SP28, the reproduction section 11 suspends reproduction of an audio data D1 presently being reproduced in accordance with a play list PL associated with a channel used before the channel was changed. Then, the reproduction section 11 continues the processing procedure RT2 to a step SP29. At the step SP29, the reproduction section 11 requests the display processing section 16 to update the selection screen 20 on the display section 17 and starts reproduction of an audio data D1 according to a play list PL associated with a channel obtained as a result of the process to change the channel from the characteristic position of the audio data D1. Then, the reproduction section 11 continues the processing procedure RT2 to a step SP30. Finally, the reproduction section 11 ends the procedure RT2 of the processing to change a channel to another one at the step SP30.

By the way, if the determination result produced in the process carried out at the step SP23 is a negation, the result of the determination is typically interpreted as a determination result indicating that the data of the play list PL is damaged data. Thus, if the determination result produced in the process carried out at the step SP23 is a negation, the reproduction section 11 continues the processing procedure RT2 to a step SP31. By the same token, if the determination result produced in the process carried out at the step SP27 is a negation, on the other hand, the result of the determination is typically interpreted as a determination result indicating that the data of the audio data D1 read out from the recording medium 13 is damaged data. Thus, if the determination result produced in the process carried out at the step SP27 is a negation, the reproduction section 11 also continues the processing procedure RT2 to the step SP31. At the step SP31, the reproduction section 11 carries out error processing by, for example, notifying the user that the audio data D1 cannot be reproduced. Finally, the reproduction section 11 ends the procedure RT2 of the processing to change a channel to another one at the step SP30. As described above, the reproduction section 11 carries out the processing to change a channel to another one in accordance with a command entered by the user in the course of the execution of the list-based reproduction function.

Figure 11:
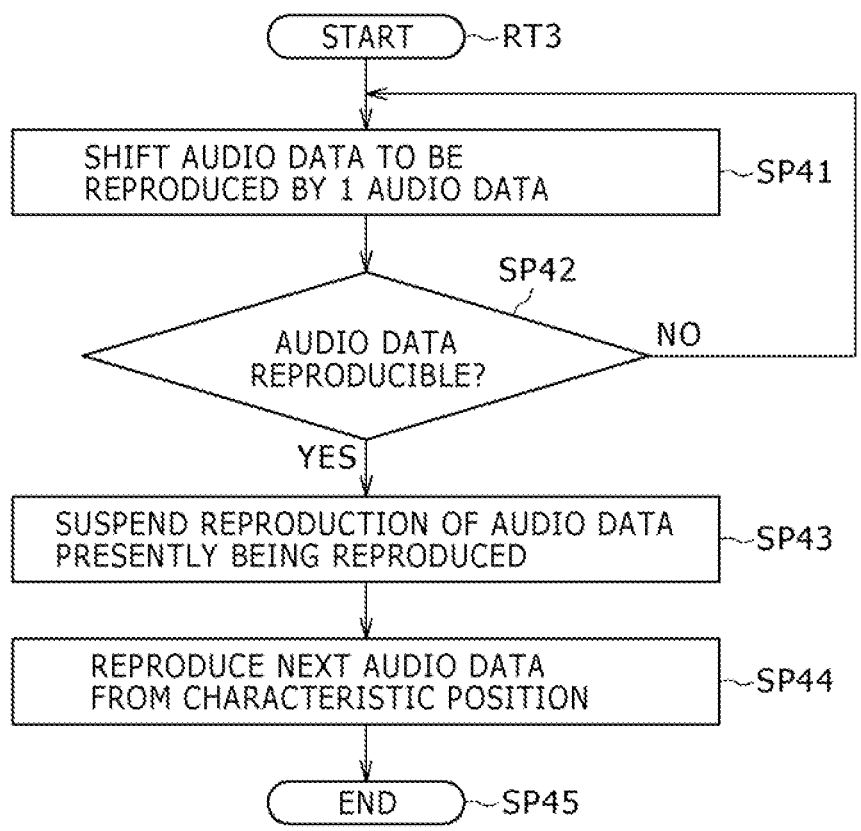
FIG. 11 shows a flowchart representing the procedure of processing to change an audio data D1 being reproduced to another.

The following description explains a musical-content switching process carried out in the course of the execution of the list-based reproduction function. Let us assume that the user operates the operation section 12 in order to enter command to change an audio data D1 to another one in the course of the execution of the list-based reproduction function. In this case, the reproduction section 11 starts a procedure RT3 represented by a flowchart shown in FIG. 11 as the procedure of processing to change an audio data D1 to another one. As shown in the figure, the flowchart representing the processing procedure begins with a step SP41 at which the reproduction section 11 takes an audio data D1 included on the presently selected play list PL as an audio data D1 immediately preceding the audio data D1 currently being reproduced or an audio data D1 included on the play list PL as an audio data D1 immediately succeeding the audio data D1 currently being reproduced as a new audio data D1 in accordance with the array of pieces of content recording location information MID recorded on the play list PL and in accordance with a direction specified by the user as the direction of the process to change the audio data D1 to another one. If a shuffle reproduction way has been specified, the array of pieces of content recording location information MID is an array obtained after rearrangement of the pieces of content recording location information MID. Then, the reproduction section 11 reads out the new audio data D1 from the recording medium 13. Subsequently, the reproduction section 11 continues the processing procedure RT3 a step SP42.

At the step SP42, the reproduction section 11 produces a result of determination as to whether or not the new audio data D1 can be reproduced. If the determination result produced in the process carried out at the step SP42 is a negation, the result of the determination is interpreted as a determination result indicating that the data of the new audio data D1 read out from the recording medium 13 is damaged data for example or the reproduction setting information PS included in the content-related information TR for the new audio data D1 indicates that the new content data audio data D1 is set as data not to be reproduced. Anyway, if the determination result produced in the process carried out at the step SP42 is a negation, the result of the determination is interpreted as a determination result indicating that the new audio data D1 cannot be reproduced unless the new audio data D1 is changed to another new audio data D1. Thus, if the determination result produced in the process carried out at the step SP42 is a negation, the flow of the processing procedure RT3 goes back to the step SP41 at which at which the reproduction section 11 takes an audio data D1 included on the presently selected play list PL as an audio data D1 immediately preceding the new audio data D1 or an audio data D1 included on the play list PL as an audio data D1 immediately succeeding the new audio data D1 as the other new audio data D1. Then, the reproduction section 11 carries out the determination process of the step S42 on the other new audio data D1.

If the determination result produced in the process carried out at the step SP42 is an affirmation, on the other hand, the result of the determination is interpreted as a determination result indicating that the data of the new audio data D1 read out from the recording medium 13 is not damaged data for example or the reproduction setting information PS included in the content-related information TR for the new audio data D1 indicates that the new content data audio data D1 is set as data to be reproduced. Anyway, if the determination result produced in the process carried out at the step SP42 is an affirmation, the result of the determination is interpreted as a determination result indicating that the new audio data D1 can be reproduced. Thus, if the determination result produced in the process carried out at the step SP42 is an affirmation, the reproduction section 11 continues the processing procedure RT3 to a step SP43. At the step SP43, the reproduction section 11 suspends reproduction of an audio data D1 presently being reproduced. Then, the reproduction section 11 continues the processing procedure RT3 to a step SP44. At the step SP44, the reproduction section 11 requests the display processing section 16 to update the selection screen 20 on the display section 17 and starts reproduction of the new audio data D1 determined last in the process carried out at the step SP41. Then, the reproduction section 11 continues the processing procedure RT3 to a step SP45. Finally, the reproduction section 11 ends the procedure RT3 of the processing to change the audio data D1 being reproduced to another one at a step SP45. As described above, the reproduction section 11 carries out the processing to change the audio data D1 being reproduced to another one in accordance with a request made by the user in the course of the execution of the list-based reproduction function.

In addition to the sections included in the configuration described above by referring to FIG. 2, the reproduction apparatus 10 also employs an analysis section 18 for analyzing the characteristic of the audio data D1 before the audio data D1 is registered on a play list PL selected in accordance with the result of the characteristic analysis. To be more specific, the analysis section 18 is a unit for analyzing the characteristic of music according to the audio data D1. In the case of an audio data D1 read out by the reproduction section 11 from a recording medium mounted on the reproduction apparatus 10 and recorded onto the recording medium 13 or an audio data D1 downloaded from an external apparatus 15 and recorded onto the recording medium 13, however, the analysis section 18 analyzes the characteristic of the audio data D1 later on only when the processing load borne by the reproduction apparatus 10 is light.

Thus, when an audio data D1 is read out by the reproduction section 11 from a recording medium mounted on the reproduction apparatus 10 and recorded onto the recording medium 13 or an audio data D1 is downloaded from the external apparatus 15 and recorded onto the recording medium 13, the reproduction section 11 provides an analysis flag in the content attribute information DAT for the audio data D1 as a flag indicating whether or not the analysis section 18 has analyzed the characteristic of the audio data D1. Then, the reproduction section 11 sets the analysis flag included in the content attribute information DAT for the audio data D1 in the process of recording the audio data D1 onto the recording medium 13 at a value indicating that the analysis section 18 has not analyzed the characteristic of the audio data D1 yet.

Thus, the analysis section 18 is capable of searching the recording medium 13 for an audio data D1, the characteristic of which has not been analyzed, on the basis of the analysis flag provided in the content attribute information DAT for the audio data D1.

When the user operates the remote controller RM employed in the operation section 12 in order to enter a command to turn off the power supply, that is, when the user carries out a power-off operation on the main unit of the reproduction apparatus 10, the reproduction apparatus 10 makes a transition from a power-on state to a standby state in which operations of circuit blocks such as the reproduction section 11 are stopped. By the way, the standby state is defined as a state in which operations of most circuit blocks in the reproduction apparatus 10 are stopped so that the processing load borne by the main unit of the reproduction apparatus 10 decreases. The circuit blocks include the reproduction section 11, a communication section 14, the display processing section 16 and the display section 17. On the other hand, an idle state is defined as a state in which the reproduction section 11 stops all functions such as the content reproduction function described earlier so that the processing load borne by the main unit of the reproduction apparatus 10 is reduced to a value not exceeding a predetermined value. As a predetermined period of time lapses since the start of an idle state even in a power-on state with the idle state sustained as it is, that is, when the user does not carry out any operation on the main unit of the reproduction apparatus 10 even after the lapse of the predetermined period of time since the reproduction section 11 sets the idle state even in a power-on state, the reproduction apparatus 10 automatically makes a transition from the idle state to a standby state by stopping operations of remaining circuit blocks.

The user is allowed to select an option as to whether or not the analysis section 18 should automatically analyze the characteristic of audio data D1 having its characteristic unanalyzed yet when the main unit of the reproduction apparatus 10 is put in a standby state. If the user selects an option of having the analysis section 18 automatically analyze characteristics of audio data D1 each having its characteristic unanalyzed yet in the standby state of the main unit of the reproduction apparatus 10, the analysis section 18 starts processing to analyze characteristics of audio data D1 each having its characteristic unanalyzed yet when the reproduction apparatus 10 detects a transition made by the main unit of the reproduction apparatus 10 as a transition to a standby state in accordance with a power-off command entered by the user by carrying out a power-off operation on the operation section 12 or as the automatic transition described above as an automatic transition to a standby state from an idle state. That is to say, the analysis section 18 starts processing to analyze characteristics of audio data D1 each having its characteristic unanalyzed yet when the main unit of the reproduction apparatus 10 enters a state of a reduced processing load borne by the main unit of the reproduction apparatus 10.

In addition, if the user selects the option of having the analysis section 18 automatically analyze characteristics of audio data D1 having its characteristic unanalyzed yet in the standby state of the main unit of the reproduction apparatus 10, during the power-on state of the main unit of the reproduction apparatus 10, the analysis section 18 monitors the operating state of the reproduction section 11 and any operation carried out by the user on the operation section 12. Thus, the analysis section 18 is capable of detecting a transition made by the reproduction section 11 as a transition to an idle state and a next automatic transition from the idle state to a standby state due to no operations carried out by the user on the main unit of the reproduction apparatus 10 during a predetermined period of time starting from the beginning of the idle state. That is to say, the analysis section 18 is capable of detecting a state of a reduced processing load borne by the main unit of the reproduction apparatus 10. Therefore, the analysis section 18 is capable of starting the processing to analyze characteristics of audio data D1 having its characteristic unanalyzed yet when a transition is detected as an automatic transition from the idle state of the reproduction section 11 to the standby state of the main body of the reproduction apparatus 10.

By the way, for example during the power-on state of the main unit of the reproduction apparatus 10, the analysis section 18 periodically detects the number of all audio data D1 recorded on the recording medium 13 and the number of audio data D1 each recorded on the recording medium 13 as a content D1 having its characteristic unanalyzed yet. When the analysis section 18 detects a state in which the ratio of the number of pieces of audio data D1 each recorded on the recording medium 13 as audio data D1 having its characteristic unanalyzed yet to the number of all pieces of audio data D1 recorded on the recording medium 13 is at least equal to a value determined in advance, the display processing section 16 displays a notification screen on the display section 17. The notification screen notifies the user of the fact that the ratio of the number of pieces of audio data D1 each recorded on the recording medium 13 as audio data D1 having its characteristic unanalyzed yet to the number of all pieces of audio data D1 recorded on the recording medium 13 is at least equal to the value determined in advance.

Thus, if the user selects an option of not having the analysis section 18 automatically analyze the characteristic of audio data D1 having its characteristic unanalyzed yet in the standby state of the main unit of the reproduction apparatus 10, audio data D1 newly recorded on the recording medium 13 has its characteristic remain undesirably unanalyzed as it is. With a predetermined timing, however, the analysis section 18 is capable of prompting the user to select the option of having the analysis section 18 automatically analyze the characteristic of audio data D1 having its characteristic unanalyzed yet in a standby state of the main unit of the reproduction apparatus 10. In addition, even if the user selects the option of having the analysis section 18 automatically analyze the characteristic of audio data D1 having its characteristic unanalyzed yet in the standby state of the main unit of the reproduction apparatus 10, a plurality of pieces of audio data D1 may be newly recorded onto the recording medium 13 while the reproduction apparatus 10 is being used continuously for a long period of time without turning off the power supply. In this case, the user can be prompted to set the reproduction apparatus 10 in a standby state and have the analysis section 18 immediately analyze characteristics of the pieces of audio data D1 each having its characteristic unanalyzed yet.

As described above, the user is allowed to select an option of having the analysis section 18 automatically analyze the characteristic of audio data D1 having its characteristic unanalyzed yet. After the analysis section 18 is notified of the existence of audio data D1 having its characteristic unanalyzed yet with this option selected, upon detection of a transition made by the main unit of the reproduction apparatus 10 as a transition to a standby state due to the fact that the processing load borne by the main unit of the reproduction apparatus 10 has been reduced, the analysis section 18 starts the processing to analyze the characteristic of the audio data D1 having its characteristic unanalyzed yet. On the other hand, the user is also allowed to select an option of not having the analysis section 18 automatically analyze the characteristic of audio data D1 having its characteristic unanalyzed yet as described above. In the case of this option, when the analysis section 18 is notified of the existence of audio data D1 having its characteristic unanalyzed yet, the user is informed of two techniques for analyzing the characteristic of the audio data D1 having its characteristic unanalyzed yet in accordance with the notification of the existence of the audio data D1 having its characteristic unanalyzed yet. As one of the two techniques, the analysis section 18 requests the user to change the setting to the option of having the analysis section 18 automatically analyze the characteristic of audio data D1 having its characteristic unanalyzed yet so that when the user carries out an operation to turn off the power supply, the analysis section 18 is capable of analyzing the characteristic of the audio data D1 having its characteristic unanalyzed yet. Then, when the analysis section 18 analyzes the characteristic of the audio data D1 having its characteristic unanalyzed yet, the analysis section 18 informs the user that the analysis section 18 is analyzing the characteristic of the audio data D1.

In accordance with the other technique, the user manually drives the analysis section 18 to analyze the characteristic of audio data D1 having its characteristic unanalyzed yet even if the power-on state of the main unit of the reproduction apparatus 10 is sustained as it is. That is to say, the user enters an analysis execution command to the reproduction apparatus 10 by operating the operation section 12. Then, when the analysis section 18 analyzes the characteristic of the audio data D1 having its characteristic unanalyzed yet, the analysis section 18 informs the user that the analysis section 18 is analyzing the characteristic of the audio data D1. As the user enters an analysis execution command to the reproduction apparatus 10 by operating the operation section 12, that is, as the user carries out an analysis execution operation while the reproduction section 11 is executing a function such as the audio-data reproduction function, the reproduction section 11 forcibly stops the execution of the function in order to end the operation carried out by the reproduction section 11 itself.

Thus, when the user manually enters an analysis execution command to the reproduction apparatus 10 by operating the operation section 12, the reproduction section 11 forcibly stops the execution of a function in order to end the operation carried out by the reproduction section 11 itself in accordance with the analysis execution command so that the analysis section 18 detects a state of a reduced processing load borne by the main unit of the reproduction apparatus 10. Accordingly, in the state of a reduced processing load borne by the main unit of the reproduction apparatus 10, the analysis section 18 starts the processing to analyze the characteristic of the audio data D1 having its characteristic unanalyzed yet. By the way, also when the user manually enters an analysis execution command to the reproduction apparatus 10 by carrying out an analysis execution operation on the operation section 12 after the user enters a command to stop execution of a function such as the audio-data reproduction function to the reproduction apparatus 10 through the operation section 12, the reproduction section 11 has already stopped its operation so that the analysis section 18 detects a state of a reduced processing load borne by the main unit of the reproduction apparatus 10. Thus, also when the user manually enters an analysis execution command to the reproduction apparatus 10 by carrying out an analysis execution operation on the operation section 12, the analysis section 18 starts the processing to analyze the characteristic of the audio data D1 having its characteristic unanalyzed yet in the state of a reduced processing load borne by the main unit of the reproduction apparatus 10.

When the analysis section 18 starts the processing to analyze the characteristics of audio data D1 each having its characteristic unanalyzed yet as described above, first of all, the analysis section 18 searches the recording medium 13 for the audio data D1 each having its characteristic unanalyzed yet on the basis of the analysis flags included in the content attribute information DAT stored in the recording medium 13. Then, the analysis section 18 generates a table of information such as recording addresses at which all the audio data D1 each found in the search operation as a content D1 having its characteristic unanalyzed yet have been recorded in the recording medium 13. Thus, by sequentially specifying the recording addresses, all the audio data D1 each found in the search operation as a content D1 having its characteristic unanalyzed yet can be read out one after another from the recording medium 13. In the following description, the recording addresses from which the audio data D1 each found in the search operation as a content D1 having its characteristic unanalyzed yet can be read out are referred to as unanalyzed-content specification information whereas the table of such recording addresses is referred to as an unanalyzed-content table.

By the way, the user is typically allowed to set an order in which pieces of audio data D1 each having its characteristic unanalyzed yet are to be read out from the recording medium 13 and to be analyzed by the analysis section 18. Thus, in the process to create an unanalyzed-data table, the analysis section 18 arranges pieces of unanalyzed-data specification information in the table on the basis of the order set by the user as a data reproduction order. As an alternative, the analysis section 18 rearranges pieces of unanalyzed-data specification information in the unanalyzed-data table in accordance with the data attribute information DAT of the audio data D1. As described earlier, the data attribute information DAT of audio data D1 includes the recording date and time of the data D1, the provider of the data D1, the name of the artist of the data D1 and the genre of the data D1.

By the way, the order in which all pieces of audio data D1 each having its characteristic unanalyzed yet are to be read out from the recording medium 13 can be a recording date/time sequential order starting with a piece of audio data D1 recorded most recently at the head of the order and ending with a piece of audio data D1 recorded least recently at the tail of the order. As an alternative, all pieces of audio data D1 to be read out from the recording medium 13 as pieces of contents D1 each having its characteristic unanalyzed yet are classified by audio-data provider, artist name or genre into audio-data provider, artist and genre categories respectively. Then, pieces of audio data D1 classified in each of the audio-data provider, artist and genre categories as pieces of audio data D1 each having its characteristic unanalyzed yet are rearranged in the recording date/time sequential order starting with a piece of audio data D1 recorded most recently at the head of the order and ending with a piece of audio data D1 recorded least recently at the tail of the order as described above. As another alternative, all pieces of audio data D1 to be read out from the recording medium 13 as pieces of audio data D1 each having its characteristic unanalyzed yet are rearranged in an alphabetical order of the titles of the pieces of audio data D1. As a further alternative, all pieces of audio data D1 to be read out from the recording medium 13 as pieces of data D1 each having its characteristic unanalyzed yet are classified by audio-data provider, artist name or genre into audio-data provider, artist and genre categories respectively. Then, pieces of audio data D1 classified in each of the audio-data provider, artist and genre categories as pieces of audio data D1 each having its characteristic unanalyzed yet are rearranged in the alphabetical order of the titles of the pieces of audio data D1.

The analysis section 18 reads out audio data D1 each having its characteristic unanalyzed yet from the recording medium 13 in accordance with the unanalyzed-content table and stores the contents D1 in an internal memory. Then, the analysis section 18 reads out one of the audio data D1 each having its characteristic unanalyzed yet from the internal memory in accordance with a read order indicated by the unanalyzed-content table and analyzes the characteristic of music according to the content D1. These operations are carried out repeatedly for each of the audio data D1 each having its characteristic unanalyzed yet in order to sequentially analyze the characteristics of pieces of music according to the individual contents D1.

Even if the analysis section 18 starts the processing to analyze the characteristics of the audio data D1 each having its characteristic unanalyzed yet in the state of a reduced processing load borne by the main unit of the reproduction apparatus 10 in accordance with an operation carried out by the user to turn off the power supply or an operation carried out by the user to execute the processing to analyze the characteristics of the audio data D1 each having its characteristic unanalyzed yet, the main unit of the reproduction apparatus 10 may make a transition back to the state of a heavy processing load borne by the main unit of the reproduction apparatus 10 in accordance with an operation carried out by the user to turn on the power supply or an operation carried out by the user to select a function. In this case, the analysis section 18 suspends the processing to analyze the characteristics of the audio data D1 each having its characteristic unanalyzed yet so that the main unit of the reproduction apparatus 10 is capable of satisfying the request made by the user. For this reason, the analysis section 18 limits the number of audio data D1 to be read out from the recording medium 13 as contents D1 each having its characteristic unanalyzed yet in a process to analyze the characteristics of the audio data D1 to a predetermined upper limit of typically 50. In the following description, the upper limit of the number of audio data D1 to be read out from the recording medium 13 as contents D1 each having its characteristic unanalyzed yet in a process to analyze the characteristics of the audio data D1 is referred to as an upper-limit constant.

Thus, if the number of audio data D1 to be read out from the recording medium 13 as contents D1 each having its characteristic unanalyzed yet in a process to analyze the characteristics of the audio data D1 is not greater than the upper-limit constant, the analysis section 18 is capable of reading out all the audio data D1 from the recording medium 13 in one read process. If the number of audio data D1 to be read out from the recording medium 13 as contents D1 each having its characteristic unanalyzed yet in a process to analyze the characteristics of the audio data D1 is greater than the upper-limit constant, on the other hand, the analysis section 18 reads out only n audio data D1 each having its characteristic unanalyzed yet, where n is equal to the upper-limit constant, from the recording medium 13 in one read process. Then, as the processing to analyze the characteristics of the n audio data D1 each having its characteristic unanalyzed yet is completed, the analysis section 18 again reads out n audio data D1 each having its characteristic unanalyzed yet or all the remaining audio data D1 each having its characteristic unanalyzed yet from the recording medium 13 and analyzes the characteristics of the audio data D1.

It is thus possible to shorten the time required by the analysis section 18 to read out pieces of audio data D1 each having its characteristic unanalyzed yet from the recording medium 13 in one read process. As a result, the analysis section 18 is capable of substantially reducing the length of the period of time between detection of a state of a decreased processing load borne by the main unit of the reproduction apparatus 10 and the start of the processing to analyze the characteristics of the pieces of audio data D1 each having its characteristic unanalyzed yet. For this reason, the analysis section 18 is capable of analyzing the characteristics of a very large number of pieces of audio data D1 each having its characteristic unanalyzed yet even for a case in which the time period between the detection of a state of a decreased processing load borne by the main unit of the reproduction apparatus 10 and the suspension of the processing to analyze the characteristics of the pieces of audio data D1 is relatively short. The processing to analyze the characteristics of the pieces of audio data D1 each having its characteristic unanalyzed yet is suspended typically because the main unit of the reproduction apparatus 10 enters a power-on state or makes a transition back to the state of a heavy processing load due to either of a power-on operation and a function selection operation, which are carried out by the user.

In the processing to analyze the characteristic of the audio data D1 having its characteristic unanalyzed yet, the analysis section 18 actually carries out a frequency analysis process and a characteristic quantization process following the frequency analysis process. The frequency analysis process is a process to analyze the frequency of the audio data D1. On the other hand, the characteristic quantization process is a process to convert the characteristic of music according to the audio data D1 into a number on the basis of the result of the frequency analysis process. To put it concretely, first of all, the analysis section 18 reads out an audio data D1 having its characteristic unanalyzed yet from the internal memory and carries out the frequency analysis process on the audio data D1. In the frequency analysis process, the analysis section 18 divides the audio data D1 read out from the internal memory as an audio data D1 having its characteristic unanalyzed yet into predetermined unit-processing portions laid adjacently to each other along the music time axis. Typically, a unit-processing portion corresponds to a musical portion having a length of one second. Then, the analysis section 18 sequentially extracts an energy from the unit-processing portions for each frequency band corresponding to each of 12 musical scales of one octave.

In this way, the analysis section 18 obtains an energy for each of the frequency bands for the entire audio data D1. Then, the analysis section 18 carries out the characteristic quantization process on the basis of the energy extracted for each frequency band. In this way, the analysis section 18 is capable of detecting various kinds of information such as information on musical instruments used in the musical performance of the music according to the audio data D1, chords and tempos. Then, on the basis of the detected information, the analysis section 18 converts the characteristic of the music according to the audio data D1 into a plurality of numbers each computed for an item, which is referred to hereafter as a characteristic item, and generates characteristic numerical information SN composed of a plurality of characteristic numbers representing the characteristic of the music.

FIG. 12 is a table showing typical characteristic numbers composing the characteristic numerical information SN generated by the analysis section 18 as numerical information representing the characteristic of music according to an audio data D1. As shown in the figure, the characteristic numbers composing the characteristic numerical information SN have been found for a plurality of different characteristic items such as a tempo, a dispersion (or musical variation) characteristic item, a major (or a musical scale) characteristic item and a rhythmratio (or a rhythm) characteristic item, which represent the basic characteristic of music. In addition, the characteristic numbers composing the characteristic numerical information SN have been found for a plurality of other different characteristic items such as an acoustic characteristic item, an energy characteristic item, a classic characteristic item, a jazz characteristic item and a café characteristic item which represent the atmosphere of music. On top of that, the characteristic numbers composing the characteristic numerical information SN have been found for a plurality of further different characteristic items such as a happy characteristic item, a sad characteristic item, a bright characteristic item, a joyful characteristic item and a fresh characteristic item, which represent the impression of music.

As described above, the analysis section 18 analyzes the characteristic of the audio data D1 and generates characteristic numerical information SN as a result of the analysis. That is to say, the analysis section 18 generates a plurality of characteristic numbers each found for one of a plurality of characteristic items. Then, the analysis section 18 outputs the characteristic numerical information SN and the recording address of the audio data D1 having its characteristic already analyzed to the registration section 19. It is to be noted, the analysis section 18 stores the characteristic numerical information SN of an audio data D1 in a tag added to the audio data D1 at the head or tail of the audio data D1.

By the way, there are a plurality of concrete themes that each can be determined as a theme for registering pieces of audio data D1 in one of a plurality of play lists PL having different types each corresponding to one of the concrete themes. A predetermined number of pieces of audio data D1 of the same concrete theme can then be selected from all pieces of audio data D1 recorded on the recording medium 13 on the basis of typically the data attribute information DAT associated with each of the pieces of audio data D1 as pieces of audio data D1 to be registered on a play list PL created for the concrete theme matching the data attribute information DAT.

By the same token, there are a plurality of abstract themes that can each be determined as a theme for registering audio data D1 in one of a plurality of play lists PL having different types each corresponding to one of the abstract themes. Examples of the abstract themes are a climate theme, a performance-place theme, a season theme, a mood theme, an atmosphere theme and an event theme. Audio data D1 of the same abstract theme can then be selected from all audio data D1 stored in the recording medium 13 on the basis of the characteristics of the audio data D1 and registered on a play list PL created for the abstract theme as audio data D1 having similar musical characteristics corresponding to the theme. In this case, audio data D1 having similar characteristics corresponding to the same abstract theme can be interpreted as contents D1 causing listeners to imagine the same abstract as the abstract corresponding to the characteristics.

After abstract themes are determined, it is possible to set conditions each used for selecting audio data D1 of the same abstract theme from all audio data D1 stored in the recording medium 13 on the basis of the characteristics of the audio data D1 and registering the selected contents D1 on a play list PL for the theme. For registering audio data D1 on any one of the play lists PL, there are a plurality of conditions each used for selecting the audio data D1 of the same abstract theme from all audio data D1 stored in the recording medium 13 on the basis of the characteristics of the audio data D1. Each of the conditions arbitrarily specifies one characteristic item or a plurality of characteristic items as well as lower and upper threshold values of characteristic numbers computed for each of the specified character items. Each of the condition requires that the characteristic number found for a selected audio data D1 as a characteristic number found for the specified characteristic item shall be typically at least equal to the specified lower threshold value, not greater than the specified upper threshold value or at least equal to the specified lower threshold value but not greater than the specified upper threshold value.

FIG. 13 is a registration-condition table RET1 showing a plurality of play lists PL stored in the recording medium 13 employed in the audio-data reproduction apparatus 10 as play lists PL each imposing registration conditions on audio data D1 to be registered on the play list PL. The registration conditions each specify one characteristic item or a plurality of characteristic items as well as lower and upper threshold values of characteristic numbers computed for each of the specified character items. In the following description, such play lists PL are each particularly referred to as a threshold-based play list PL. Each of the second and subsequent rows of the first registration-condition table RET1 typically includes a threshold-based play list PL and the name of the threshold-based play list PL. Thus, every time the registration section 19 receives the characteristic numerical information SN of the audio data D1 from the analysis section 18, the registration section 19 collates the characteristic numerical information SN with the conditions set for each of threshold-based play lists PL in the first registration-condition table RET1 in order to produce a result of determination as to whether or not the audio data D1 can be registered on any one of the threshold-based play lists PL, that is, whether or not the characteristic of the audio data D1 allows the audio data D1 to be registered on any one of the threshold-based play lists PL or whether or not the characteristic numbers of the audio data D1 match the registration conditions set for any one of the threshold-based play lists PL. As described earlier, the characteristic numerical information SN includes a plurality of characteristic numbers found for each of characteristic items.

If the result of the determination indicates that the characteristic of the audio data D1 allows the audio data D1 to be registered on a specific one of the threshold-based play lists PL, the registration section 19 records a recording address received from the analysis section 18 as the recording address of the audio data D1 or audio-data registration information TR received from the analysis section 18 as the audio-data recording location information MID of the audio data D1 on the specific threshold-based play list PL. By carrying out such a process, the registration section 19 registers the audio data D1 on the specific threshold-based play list PL according to the characteristic of the audio data D1.

By the way, there is a case in which the characteristic of the audio data D1 matches a registration condition set for a plurality of threshold-based play lists PL such as threshold-based play lists PL1 and PL2 shown in FIG. 14 as a condition common to the play lists. To be more specific, the common registration condition specifies a characteristic item, an upper threshold value and a lower threshold value, which are common to the threshold-based play lists PL. In this case, the reproduction apparatus 10 basically permits the audio data D1 to be registered in the threshold-based play lists PL sharing the same registration condition.

However, it is quite within the bounds of possibility that a relatively large number of audio data D1 match a registration condition common to a plurality of threshold-based play lists such as PL1 and PL2 in the reproduction apparatus 10. In this case, the user is allowed to put the threshold-based play lists PL1 and PL2 in an exclusive group in the so-called group setting operation or the like. Then, if the characteristic of the audio data D1 matches the registration condition common to a plurality of threshold-based play lists such as PL1 and PL2 put in the same exclusive group, the registration section 19 registers the audio data D1 only in some of the threshold-based play lists PL and not in the remaining threshold-based play lists PL in accordance with factors such as the total number of audio data D1 already registered in each of the threshold-based play lists PL, the number of characteristic items used a registration condition in each of the threshold-based play lists PL and the lower and upper threshold values of characteristic numbers computed for each of the character items.

In this way, if it is quite within the bounds of possibility that a relatively large number of audio data D1 match a registration condition common to a plurality of threshold-based play lists such as PL1 and PL2 pertaining to an exclusive group, the registration section 19 is capable of preventing a large number of audio data each matching a registration condition common to the threshold-based play lists PL from being registered on the threshold-based play lists PL. Thus, when any one of the threshold-based play lists such as PL1 and PL2 pertaining to an exclusive group is used in reproduction of an audio data D1 registered by the registration section 19 in one of the threshold-based play lists PL, the user will listen to music varying from play list to play list without regard to whether the user listen to the music on a trial basis or not. Since the registration section 19 registers an audio data D1 matching a registration condition common to a plurality of threshold-based play lists such as PL1 and PL2 pertaining to an exclusive group only in some of the threshold-based play lists PL and not in the remaining threshold-based play lists PL in accordance with factors such as the total number of audio data D1 already registered in each of the threshold-based play lists PL, the number of characteristic items used a registration condition in each of the threshold-based play lists PL and the lower and upper threshold values of characteristic numbers computed for each of the character items as described above, the registration section 19 is capable of very effectively avoiding a state in which the total number of audio data D1 already registered in each of the threshold-based play lists PL considerably varies from play list to play list.

FIG. 15 is a table showing a plurality of pieces of audio data D1 recorded on the recording medium 13 as pieces of audio data D1 having characteristic numbers relatively close to each other as numbers computed for certain characteristic items. To put it concretely, the characteristic numbers computed for first and second characteristic items as the characteristic numbers of pieces of audio data D1A to D1D are relatively close to each other.

FIG. 16 is a typical registration-condition table showing a plurality of threshold-based play lists PL not pertaining to an exclusive group. To be more specific, the registration-condition table shows two threshold-based play lists named X and Y respectively. The registration section 19 imposes a relatively strict condition for registration of audio data D1 on both the threshold-based play lists X and Y. The relatively strict registration condition sets the lower limit of a range of characteristic numbers found for a characteristic item determined in advance at a relatively large value and the upper limit of the range of the characteristic numbers found for the characteristic item at a relatively small value. That is to say, the relatively strict condition sets a narrow range of the characteristic numbers found for the characteristic item. As a result, the registration section 19 registers only some of pieces of audio data D1 on both the threshold-based play lists named X and Y respectively. In the case of the pieces of audio data D1A to D1D having characteristic numbers relatively close to each other as numbers computed for the characteristic items determined in advance as shown in the table of FIG. 15, the registration section 19 registers the audio data D1A on both the threshold-based play lists named X and Y. However, there may be a situation in which the registration section 19 does not register the remaining pieces of audio data D1B to D1D on the threshold-based play lists named X and Y as shown in a table of FIG. 17.

As described above, by imposing relatively strict registration conditions on each of threshold-based play lists PL in the reproduction apparatus 10, it is possible to strictly select audio data D1 of the same abstract theme from all audio data D1 stored in the recording medium 13 on the basis of the characteristics of the audio data D1 and register the audio data D1 on a threshold-based play list PL provided for a theme as audio data D1 having similar characteristics corresponding to the theme. In this case, audio data D1 having similar characteristics corresponding to the same abstract theme can be interpreted as contents D1 causing listeners to imagine all but the same abstract as the abstract corresponding to the characteristics theme. As a result, the number of audio data D1 recorded in the recording medium 13 employed in the reproduction apparatus 10 as contents D1 not registered in any of the threshold-based play lists PL among a plurality of audio data D1 recorded in the recording medium 13 increases.

On the other hand, FIG. 18 is another typical registration-condition table showing a plurality of threshold-based play lists PL not pertaining to an exclusive group. To be more specific, the registration-condition table shows two threshold-based play lists named X and Y respectively. The registration section 19 sets a registration condition in a relatively lenient state as a condition for registration of audio data D1 on both the threshold-based play lists X and Y. The relatively lenient registration condition sets the lower limit of a range characteristic numbers found for a characteristic item determined in advance at a relatively small value and the upper limit of the range of the characteristic numbers found for the characteristic item at a relatively large value. That is to say, the relatively lenient condition sets a wide range of the characteristic numbers found for the characteristic item. As a result, it is quite within the bounds of possibility that the registration section 19 registers some of pieces of audio data D1 having characteristic numbers relatively close to each other on both the threshold-based play lists named X and Y respectively. In the case of the pieces of audio data D1A to D1D having characteristic numbers relatively close to each other as numbers computed for the characteristic items determined in advance as shown in the table of FIG. 15, the registration section 19 registers all the pieces of audio data D1A to D1D on the threshold-based play lists named X and registers the pieces of audio data D1A and D1C on the threshold-based play list named Y as shown in a table of FIG. 19.

As described above, by imposing relatively lenient registration conditions on each of threshold-based play lists PL in the reproduction apparatus 10, the registration section 19 selects audio data D1 of the same abstract theme from all audio data D1 stored in the recording medium 13 on the basis of the characteristics of the audio data D1 and register audio data D1 on the threshold-based play lists PL each provided for the theme as audio data D1 having similar characteristics corresponding to a theme as well as audio data D1 of an abstract theme from all audio data D1 stored in the recording medium 13 on the basis of the characteristics of the audio data D1 and register the audio data D1 on the threshold-based play lists PL each provided for the theme as audio data D1 having dissimilar characteristics not corresponding to the theme. In this case, audio data D1 having similar characteristics corresponding to the same abstract theme can be interpreted as contents D1 causing listeners to imagine all but the same abstract as the abstract corresponding to the characteristics theme whereas audio data D1 having dissimilar characteristics not corresponding to the abstract theme can be interpreted as contents D1 causing listeners to imagine a different abstract theme.

For the reasons described above, the registration section 19 employed in the reproduction apparatus 10 experimentally registers a variety of audio data D1 on a plurality of threshold-based play lists PL and, in accordance with a result of the experimental registration, the registration conditions set for the threshold-based play lists PL are properly adjusted. Thus, the registration section 19 registers a plurality of audio data D1 having characteristic numbers close to each other on threshold-based play lists PL determined in advance by properly distributing the audio data D1 among the threshold-based play lists PL. To put it concretely, as shown in a typical registration result of FIG. 20, the registration section 19 registers the audio data D1A to D1D on the threshold-based play lists named X and Y by properly distributing the audio data D1A to D1D among the threshold-based play lists X and Y. That is to say, while the registration section 19 is very effectively preventing the number of audio data D1 recorded in the recording medium 13 employed in the reproduction apparatus 10 as contents D1 not registered in any of the threshold-based play lists PL among a plurality of audio data D1 recorded in the recording medium 13 from increasing, the registration section 19 is capable of selecting audio data D1 of the same abstract theme from all audio data D1 stored in the recording medium 13 on the basis of the characteristics of the audio data D1 and registering audio data D1 on the threshold-based play lists PL each provided for a theme as audio data D1 having similar characteristics corresponding to the theme. In this case, audio data D1 having similar characteristics corresponding to the same abstract theme can be interpreted as contents D1 causing listeners to imagine all but the same abstract as the abstract corresponding to the characteristics theme.

In the reproduction apparatus 10, however, the registration conditions of each threshold-based play list PL are set without taking the registration conditions of each other threshold-based play list PL into consideration. As described earlier, each of the registration conditions set for any threshold-based play list PL specifies the number of used characteristic items, the type of each of the characteristic items, the upper threshold value of characteristic numbers found for each of the characteristic items and the lower threshold value of characteristic numbers found for each of the characteristic items in accordance with the abstract theme determined for the threshold-based play list PL. Therefore, in the reproduction apparatus 10, even if the registration conditions set for each threshold-based play list PL are properly adjusted, all audio data D1 recorded on the recording medium 13 are not necessarily allocated to any of threshold-based play lists PL and registered thereon. It is thus quite within the bounds of possibility that an audio data D1 not allocated to any of threshold-based play lists PL and not registered thereon exists in the recording medium 13.

Accordingly, in the reproduction apparatus 10, with an abstract theme determined, a plurality of play lists PL used for registering audio data D1 on the basis of the characteristics of the contents D1 are not limited to the threshold-based play lists PL described above but also include a predetermined number of play lists PL each prepared in advance as a play list PL imposing registration conditions making use of a cluster obtained by adoption of a content classification technique based on characteristics of audio data D1. In the following description, the content classification technique based on characteristics of audio data D1 is refereed to as a clustering technique. In this case, the registration section 19 employed in the reproduction apparatus 10 experimentally makes use of a plurality of characteristic numbers, which have been found for the same characteristic item as characteristic numbers of each of many audio data D1, as coordinate values of a multi-dimensional space to implement a multi-dimensional clustering technique on the numerous audio data D1 in advance. In this way, the registration section 19 generates a plurality of clusters each serving as a collection of audio data D1 having characteristics similar to each other. That is to say, the registration section 19 classifies the audio data D1 having characteristics similar to each other into a plurality of clusters. Then, the registration section 19 detects center coordinate values of a multi-dimensional space or every cluster. In the following description, the center coordinate values of a multi-dimensional space or every cluster are referred to as cluster center values.

By the way, the registration section 19 implements the multi-dimensional clustering technique on a number of audio data D1 in such a way that each of the numerous audio data D1 is always put in a cluster. In addition, the total number of clusters is typically set at a value greater than a predetermined number of play lists PL each imposing registration conditions each making use of a cluster in registration of an audio data D1. In the following description, a of play list PL imposing registration conditions each making use of a cluster in registration of an audio data D1 is particularly referred to as a cluster-based play list PL.

In addition, in the reproduction apparatus 10, audio data D1 pertaining to a plurality of clusters are reproduced as music to be actually listened to by the user. Thus, for each cluster-based play list PL, a cluster is selected as a cluster including audio data D1 of music having a characteristic matching the abstract theme determined for the cluster-based play list PL. Then, in accordance with the result of the process to select clusters, in the reproduction apparatus 10, at least one cluster are associated with each of a predetermined number of cluster-based play lists PL so that only one cluster-based play list PL always corresponds to any one of the clusters.

Thus, on the basis of the characteristic of music according to a new audio data D1 and a cluster center value, the reproduction apparatus 10 determines a cluster to include the new audio data D1. In addition, the reproduction apparatus 10 sets registration conditions for a cluster-based play list PL associated with the determined cluster as registration conditions used for registering the new audio data D1 on the cluster-based play list PL. Then, a second registration-condition table RET2 like one shown in FIG. 21 is stored in the recording medium 13 employed in the reproduction apparatus 10. Each of the second and subsequent rows in the second registration-condition table RET2 shows a registration condition associating a cluster center value with a list name. The cluster center value is the center value of a cluster indicated by a cluster number shown on the same row as the cluster center value. A cluster number of a cluster is an identification peculiar to the cluster and used for uniquely identifying the cluster among a plurality of clusters. The list name is the name of a cluster-based play list PL used for registering audio data D1 pertaining to the cluster as contents D1 each having a musical characteristic matching an abstract theme determined for the cluster-based play list PL.

In this state, every time the characteristic numerical information SN for an audio data D1 is received from the analysis section 18, the registration section 19 carries out a process to register the audio data D1 on a threshold-based play list PL described above and also a process to register the audio data D1 on a cluster-based play list PL. That is to say, when the characteristic numerical information SN for an audio data D1 is received from the analysis section 18, the registration section 19 fetches all characteristic numbers found for the same characteristic item to be used in a multi-dimensional clustering process from all characteristic numbers included in the characteristic numerical information SN.

Figure 22:
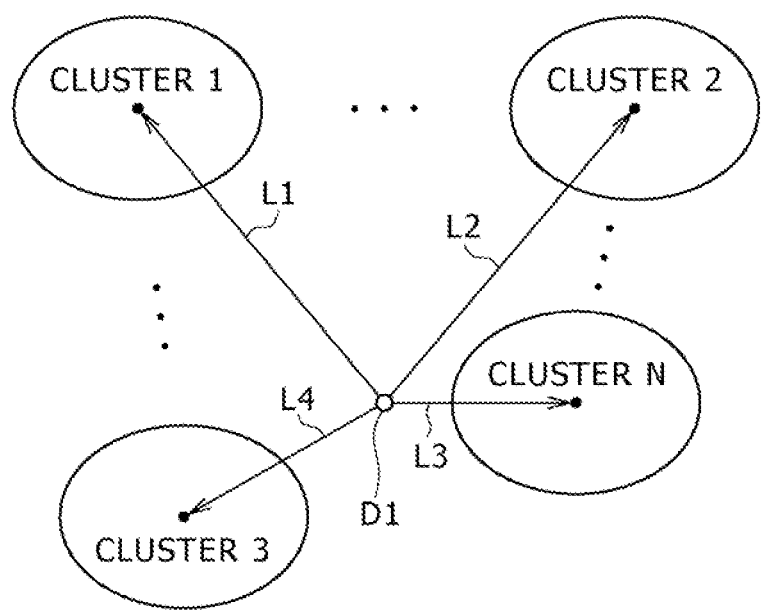
FIG. 22 is a rough explanatory diagram to be referred to in description of a process to detect vector spatial distances between a piece of audio data and clusters.

Then, the registration section 19 detects each of vector spatial distances L1 to L4 shown in FIG. 22. As shown in the figure, a vector spatial distance is the distance between the position of an audio data D1 and the center position indicated by the cluster center value shown in the second registration-condition table RET2 as the cluster center value of a cluster. The position of an audio data D1 is indicated by coordinate values in the multi-dimensional space. The coordinate values of the position of an audio data D1 in the multi-dimensional space are a plurality of characteristic numbers fetched from the characteristic numerical information SN as characteristic numbers found for the same characteristic item. Then, the registration section 19 selects a cluster with its center located at the shortest vector spatial distance L3 from the position of the audio data D1 among all the clusters located at the shortest vector spatial distances L1 to L4. In this typical case, the registration section 19 selects a cluster with its center located at the vector spatial distance L3 from the position of the audio data D1 in accordance with the characteristic of the audio data D1.

Then, on the basis of the result of the process to select a cluster, the registration section 19 searches the second registration condition RET2 for a cluster-based play list PL associated with the selected cluster to which the audio data D1 pertains. In this typical case, the registration section 19 finds out a cluster-based play list PL associated with a cluster with its center located at the shortest vector spatial distance L3 from the position of the audio data D1. That is to say, the registration section 19 identifies a cluster-based play list PL associated with a determined abstract theme most suitable for the characteristic of music according to the characteristic of the audio data D1 from a plurality of cluster-based play lists PL. Then, the registration section 19 records a recording address received from the analysis section 18 as the recording address of the audio data D1 on the identified cluster-based play list PL as the content recording location information MID in order to register the audio data D1 on the cluster-based play list PL associated with an abstract theme most suitable for the characteristic of music according to the audio data D1.

By the way, when the registration section 19 carries out a first content registration process to register an audio data D1 on a threshold-based play list PL after a process to analyze the characteristic of the audio data D1, in some cases, the audio data D1 cannot be registered in a threshold-based play list PL as described before. In such cases, however, the registration section 19 carries out a second content registration process to register the audio data D1 on a cluster-based play list PL. In the second content registration process to register the audio data D1 on a cluster-based play list PL, the registration section 19 finds out a cluster having the shortest vector spatial distance from the audio data D1 among the vector spatial distances L1 to L4 and registers the audio data D1 on a cluster-based play list PL associated with the cluster. That is to say, in the second content registration process, the registration section 19 is capable of reliably registering an audio data D1 with its characteristic already analyzed by the analysis section 18 on a specific one selected from a predetermined number of cluster-based play lists PL as a specific play list PL associated with an abstract theme most suitable for the characteristic of music according to the characteristic of the audio data D1.

As described above, every time the characteristic numerical information SN for an audio data D1 is received from the analysis section 18, the registration section 19 carries out the first and second content registration processes to register the audio data D1 on a threshold-based play list PL and a cluster-based play list PL respectively. Then, every time the first and second content registration processes are completed, the registration section 19 notifies the analysis section 18 that the first and second content registration processes have been completed. Notified by the registration section 19 that the first and second content registration processes have been completed, the analysis section 18 changes an analysis flag stored in the recording medium 13 as the analysis flag of the audio data D1 registered on at least the cluster-based play list PL in the second content registration process if not registered on the threshold-based play list PL in the first content registration process from a value indicating that the characteristic of the audio data D1 has not been analyzed to a value indicating that the characteristic of the audio data D1 has already been analyzed. Thus, at the start of a process carried out later on to analyze the characteristic of the audio data D1, by examining the analysis flag of the audio data D1, the analysis section 18 is capable of correctly producing a result of determination as to whether or not the characteristic of the audio data D1 has already been analyzed. As a result, the analysis section 18 is capable of preventing the process to analyze the characteristic of the audio data D1 from being carried out wastefully.

By the way, in some cases, the analysis section 18 is not capable of carrying out a process to analyze the characteristic of the audio data D1 for example because the audio data D1 to be analyzed has been damaged. In such cases, the analysis section 18 cancels the processing to analyze the characteristic of the audio data D1. That is to say, the analysis section 18 cancels the frequency-analysis and characteristic-quantization processes of the processing to analyze the characteristic of the audio data D1. Then, the analysis section 18 changes an analysis flag stored in the recording medium 13 as the analysis flag of the audio data D1 from a value indicating that the characteristic of the audio data D1 has not been analyzed to a value indicating that the audio data D1 has been damaged. Thus, at the start of a process carried out later on to analyze the characteristic of the audio data D1, by examining the analysis flag of the audio data D1, the analysis section 18 is capable of correctly producing a result of determination as to whether or not the process to analyze the characteristic of the audio data D1 has ended in a failure for example because the audio data D1 to be analyzed has been damaged. As a result, the analysis section 18 is capable of preventing the process to analyze the characteristic of the audio data D1 from being carried out wastefully.

In this way, while the analysis section 18 is sequentially analyzing the characteristics of audio data D1 recorded on the recording medium 13 as contents D1 each having its characteristic unanalyzed yet, the registration section 19 carries out the first and second registration processes on other audio data D1 each having a characteristic already analyzed by the analysis section 18 as described above. As a result, as the processing carried out by the analysis section 18 to sequentially analyze the characteristics of audio data D1 recorded on the recording medium 13 as contents D1 each having its characteristic unanalyzed yet is completed, the first and second registration processes carried out by the registration section 19 are also ended. When the processing carried out by the analysis section 18 in the standby state of the main unit of the reproduction apparatus 10 to sequentially analyze the characteristics of audio data D1 recorded on the recording medium 13 as contents D1 each having its characteristic unanalyzed yet is completed, the analysis section 18 drives the main unit of the reproduction apparatus 10 to make a transition from the standby state to a power-off state. The analysis section 18 may also carry out the processing carried out by the analysis section 18 to sequentially analyze the characteristics of audio data D1 recorded on the recording medium 13 as contents D1 each having its characteristic unanalyzed yet in a power-on state of the main unit of the reproduction apparatus 10 provided that the main unit of the reproduction apparatus 10 is in state of a light processing load. In this case, when the processing carried out by the analysis section 18 in such a power-on state of the main unit of the reproduction apparatus 10 to sequentially analyze the characteristics of audio data D1 recorded on the recording medium 13 as contents D1 each having its characteristic unanalyzed yet is completed, the analysis section 18 notifies the user typically through the display processing section 16 and the display section 17 that the characteristic analysis processing has been completed and puts the main unit of the reproduction apparatus 10 in a state of waiting for the user to carry out an operation in the state of a light processing load borne by the main unit of the reproduction apparatus 10.

By the way, during the execution of the characteristic analysis processing, the analysis section 18 is periodically monitoring the state of the entire reproduction apparatus 10 including the analysis section 18 itself and the registration section 19 in order to produce a result of determination as to whether or not the reproduction apparatus 10 is carrying out operations normally. If the result of the determination indicates that an operation abnormality has occurred in the main unit of the reproduction apparatus 10 in the course of the characteristic analysis processing, the analysis section 18 temporarily suspends the characteristic analysis processing and carries out a file saving function that allows the main unit of the reproduction apparatus 10 to be reactivated later on after a recovery from the operation abnormality. Thus, if the processing carried out by the analysis section 18 to sequentially analyze the characteristics of audio data D1 recorded on the recording medium 13 as contents D1 each having its characteristic unanalyzed yet and/or the first and second registration processes carried out by the registration section 19 enter an uncontrollable runaway state, the analysis section 18 is capable of avoiding a state in which the analysis section 18 is incapable of correctly analyzing the characteristics of audio data D1 each having its characteristic unanalyzed yet and/or the registration section 19 mistakenly registers an audio data D1 on an incorrect play list PL.

By the way, when the characteristic analysis processing is suspended to discontinue the analysis of the characteristics of audio data D1 each having its characteristic unanalyzed yet, the analysis section 18 prevents the analysis flags each assigned to the audio data D1 having its characteristic unanalyzed yet as a flag for indicating the unanalyzed state of characteristic of the content D1 from being changed. When the main body of the reproduction apparatus 10 is reactivated later on after the suspension of the characteristic analysis processing to analyze of the characteristics of audio data D1 each having its characteristic unanalyzed yet in the event of an operation abnormality occurring in the main unit of the reproduction apparatus 10, the analysis section 18 examines the value of the analysis flag of each audio data D1 in order to produce a result of determination as to whether or not the processing to analyze of the characteristics of audio data D1 each having its characteristic unanalyzed yet needs to be resumed from the state of suspension.

In actuality, the recording medium 13 of the reproduction apparatus 10 is also used for storing a control module, an analysis module and a management module in advance as pieces of middleware. The control module is a module for executing control of the entire reproduction apparatus 10. The analysis module is a module for analyzing the characteristic of the audio data D1 and registering the audio data D1 on a play list PL on the basis of the result of the characteristic analysis. The management module is typically a DBMS (Database Management System) for managing a variety of data and a variety of information, which have been recorded in the recording medium 13. In accordance with the control, analysis and management modules, the analysis section 18 carries out the characteristic analysis processing to analyze of the characteristic of the audio data D1 having its characteristic unanalyzed yet whereas the registration section 19 carries out the first and second registration processes to register an audio data D1 having its characterize analyzed by the analysis section 18 on a play list PL as described earlier.

Figure 23:
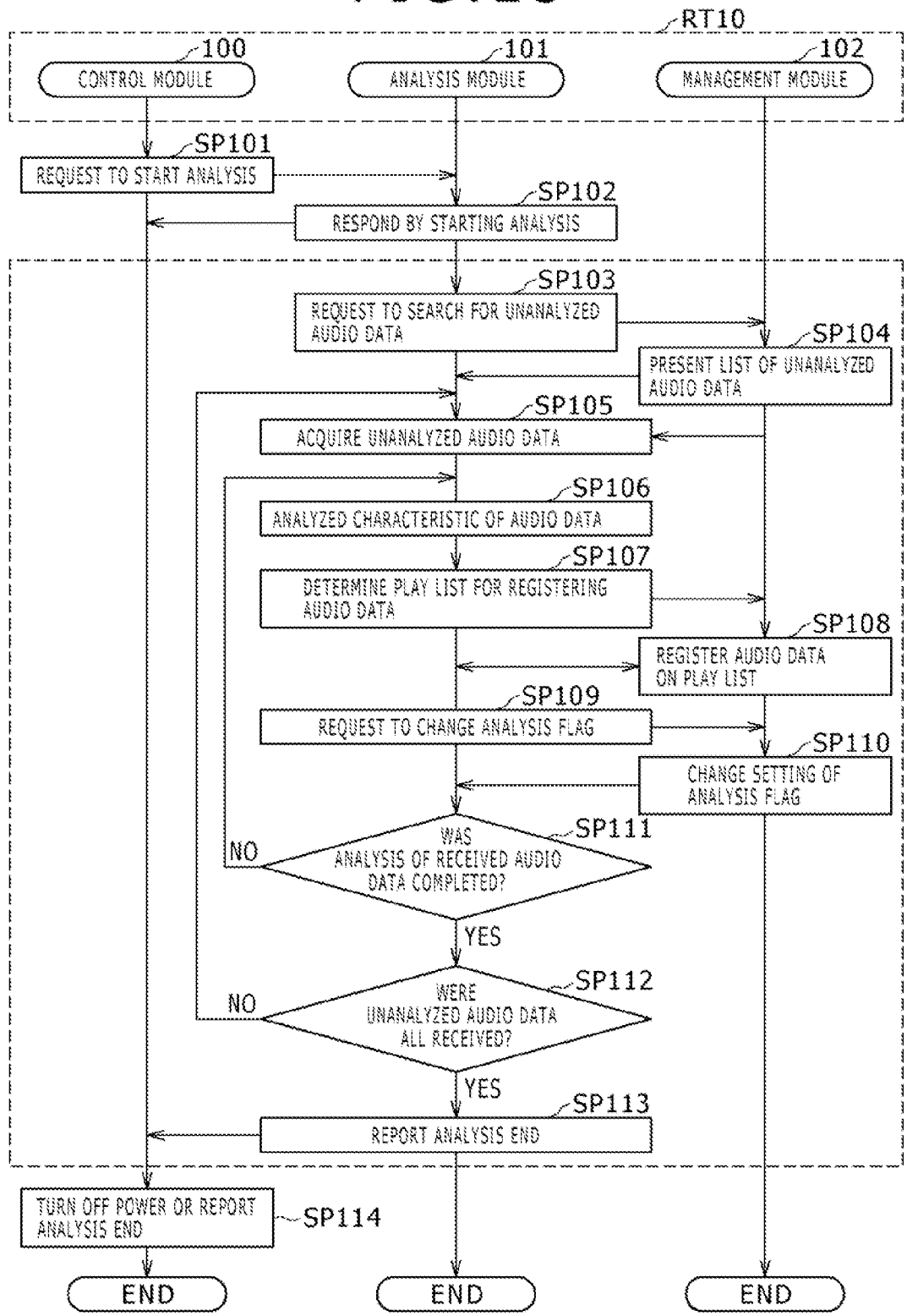
FIG. 23 shows a flowchart representing the procedure of analysis and registration processing.

By referring to a flowchart shown in FIG. 23, the following description explains the procedure RT10 of analysis and registration processing carried out by the analysis section 18 and the registration section 19 by making use of the control module 100, the analysis module 101 and the management module 102. For the sake of convenience, however, the analysis and registration processing procedure RT10 is explained as if each of that the control module 100, the analysis module 101 and the management module 102 were a hardware circuit block.

In this case, when the control module 100 detects a state of a light processing load borne by the main unit of the reproduction apparatus 10, the control module 100 starts execution of the analysis and registration processing procedure RT10. The control module 100 starts execution of the analysis and registration processing procedure RT10 at a step SP101, at which the control module 100 requests the analysis module 101 to start a process to analyze the characteristic of the audio data D1. At the request made by the control module 100, at a SP102, the analysis module 101 starts the process to analyze the characteristic of the audio data D1 and notifies the control module 100 that the process to analyze the characteristic of the audio data D1 has been started. Then, the flow of the processing procedure RT10 goes on to a step SP103.

At the step SP103, the analysis module 101 requests the management module 102 to search all audio data D1 stored in the recording medium 13 for ones each having its characteristic not unanalyzed yet. At the request made by the analysis module 101, at a SP104, the management module 102 searches the recording medium 13 for audio data D1 each having its characteristic not unanalyzed yet on the basis of analysis flags also stored in the recording medium 13. Then, the management module 102 creates a list of audio data D1 each found in the search process carried out at the step SP104 as one having its characteristic not unanalyzed yet and presents the list of audio data D1 each having its characteristic unanalyzed yet to the analysis module 101 at the next step SP104.

At a step SP105, the analysis module 101 requests the management module 102 to transmit audio data D1 according to a list received from the management module 102 as the list of audio data D1 each having its characteristic unanalyzed yet. As a result, the management module 102 reads out a plurality of audio data D1 each having its characteristic unanalyzed yet from the recording medium 13 and transmits the contents D1 to the analysis module 101. Then, the flow of the processing procedure RT10 goes on to a step SP106. At the step SP106, the analysis module 101 analyzes the characteristics of an audio data D1 to generate characteristic numerical information SN for the content D1. Then, the flow of the processing procedure RT10 goes on to a step SP107. At the step SP107, on the basis of the characteristic numerical information SN, the first registration-condition table RET1 and the second registration-condition table RET2, the analysis module 101 determines play lists PL usable for registering the audio data D1 in accordance with the characteristic of the audio data D1. The determined play lists PL usable for registering the audio data D1 can be both a threshold-based play list PL and a cluster-based play list PL or a cluster-based play list PL only. Then, the analysis module 101 notifies the management module 102 of the determined play lists PL.

Notified of the determined play lists PL, the management module 102 registers the audio data D1 on the determined play lists PL recorded on the recording medium 13 at a step SP108. As described above, the determined play lists PL can be both a threshold-based play list PL and a cluster-based play list PL or a cluster-based play list PL only. Then, when the process to register the audio data D1 on the determined play lists PL is completed, the management module 102 notifies the analysis module 101 that the process to register the audio data D1 on the determined play lists PL has been completed.

At a step SP109, the analysis module 101 requests the management module 102 to change the analysis flag of the audio data D1, which has its characteristic already analyzed and has been registered on the determined play lists PL. At the request made by the analysis module 101, at a step SP110, the management module 102 changes a flag stored in the recording medium 13 as the analysis flag of the audio data D1, which has its characteristic already analyzed and has been registered on the determined play lists PL, from a flag value indicating the characteristic of the audio data D1 has not been analyzed yet to a flag value indicating the characteristic of the audio data D1 has already been analyzed. Then, the management module 102 notifies the analysis module 101 that the value of the analysis flag has been changed.

Notified by the management module 102 that the value of the analysis flag has been changed, at a step SP111, the analysis module 101 produces a result of determination as to whether or not the analysis of characteristics of all the audio data D1 received from the management module 102 in the process carried out at the step SP105 in accordance with a single request has been completed. The determination result produced in the process carried out at the step SP111 may be a negation indicating that the analysis of the characteristics of all the audio data D1 received in accordance with a single request has not been completed, that is, the characteristics of some of the audio data D1 have not been analyzed. Thus, if the determination result produced in the process carried out at the step SP111 is a negation, the flow of the processing procedure RT10 goes back to the step SP106 at which the analysis module 101 analyzes the characteristic of another audio data D1 to generate characteristic numerical information SN for the content D1. As a matter of fact, in conjunction with the management module 102, the analysis module 101 carries out the processes of the steps SP106 to SP111 repeatedly in iteration loops till the analysis module 101 completes the analysis the characteristics of all the audio data D1 received from the management module 102 in the process carried out at the step SP105 in accordance with a single request and the management module 102 completes the processing to register all the audio data D1 on proper play lists PL.

On the other hand, the determination result produced in the process carried out at the step SP111 may be an affirmation indicating that the analysis of the characteristics of all the audio data D1 received from the management module 102 in the process carried out at the step SP105 in accordance with a single request has been completed, that is, the characteristics of all the audio data D1 have been analyzed, and the processing to register all the audio data D1 on proper play lists PL has also been completed. Thus, if the determination result produced in the process carried out at the step SP111 is an affirmation, the flow of the processing procedure RT10 goes on to a step SP112. At the step SP112, the analysis module 101 produces a result of determination as to whether or not all audio data D1 each having its characteristic unanalyzed yet have been received from the management module 102. The determination result produced in the process carried out at the step SP112 may be a negation indicating that all audio data D1 each having its characteristic unanalyzed yet have not been received from the management module 102, that is, some of the audio data D1 have not been received because the management module 102 transmits the contents D1 by dividing them into a plurality of transmission groups. Thus, if the determination result produced in the process carried out at the step SP112 is a negation, the flow of the processing procedure RT10 goes back to the step SP105 at which the analysis module 101 requests the management module 102 to transmit remaining audio data D1 according to the list received in the process carried out at the step SP105 from the management module 102 as the list of audio data D1 each having its characteristic unanalyzed yet. As a matter of fact, in conjunction with the management module 102, the analysis module 101 carries out the processes of the steps SP105 to SP112 repeatedly in iteration loops till the analysis module 101 receives all the audio data D1 from the management module 102 in accordance with the list of audio data D1 each having its characteristic unanalyzed yet and completes the analysis the characteristics of all the audio data D1 received from the management module 102 whereas the management module 102 completes the processing to register all the audio data D1 on proper play lists PL.

On the other hand, the determination result produced in the process carried out at the step SP112 may be an affirmation indicating that the analysis module 101 has received all the audio data D1 from the management module 102 in accordance with the list of audio data D1 each having its characteristic unanalyzed yet and completed the analysis the characteristics of all the audio data D1 received from the management module 102 whereas the management module 102 has completed the processing to register all the audio data D1 on proper play lists PL. Thus, if the determination result produced in the process carried out at the step SP112 is an affirmation, the flow of the processing procedure RT10 goes on to a step SP113. At the step SP113, the analysis module 101 notifies the control module 100 that the analysis module 101 has received all the audio data D1 from the management module 102 in accordance with the list of audio data D1 each having its characteristic unanalyzed yet and completed the analysis the characteristics of all the audio data D1 received from the management module 102 whereas the management module 102 has completed the processing to register all the audio data D1 on proper play lists PL. In accordance with the notification received from the analysis module 101, at a step SP114, the control module 100 turns off the power supply of the main unit of the reproduction apparatus 10 if the reproduction section 11 is in a standby state. If the reproduction section 11 is in an idle state, on the other hand, the analysis module 101 notifies the user of the fact that the analysis module 101 has completed the analysis the characteristics of all the audio data D1 each having its characteristic unanalyzed yet whereas the management module 102 has completed the processing to register all the audio data D1 on proper play lists PL. Finally, in conjunction with the analysis module 101 and the management module 102, the control module 100 completely ends the execution of the analysis and registration processing procedure RT10.

By the way, let us assume that, while the control module 100 is carrying out the processes of the steps SP103 to SP113 of the flowchart representing the analysis and registration processing procedure RT10, the control module 100 periodically transmits a normal function response request the analysis module 101 as an inquiry about whether or not the analysis module 101 is carrying its function normally. In the flowchart shown in FIG. 23, the steps SP103 to SP113 are steps enclosed by a dashed line. Every time the analysis module 101 receives a normal function response request from the control module 100, the analysis module 101 returns a normal function confirmation response indicating that the analysis module 101 and the management module 102 are functioning normally. In this way, the control module 100 is capable of periodically monitoring normal operations carried out by the entire reproduction apparatus 10 including the analysis section 18 and the registration section 19.

It is to be noted that, in the case of the first embodiment, five abstract different time-related themes such as the morning theme, the daytime theme, the evening theme, the night theme and the midnight theme are set for cluster-based play lists PL described before. Thus, the registration section 19 registers audio data D1 each causing the listener to imagine the morning time zone on a cluster-based play list PL taking the morning time zone as the abstract theme. In the following description, the cluster-based play list PL taking the morning time zone as the abstract theme is referred to as a morning play list PL.

By the same token, the registration section 19 registers audio data D1 each causing the listener to imagine the day timeslot on a cluster-based play list PL taking the day timeslot as the abstract theme. In the following description, the cluster-based play list PL taking the day timeslot as the abstract theme is referred to as a daytime play list PL.

In the same way, the registration section 19 registers audio data D1 each causing the listener to imagine the evening timeslot on a cluster-based play list PL taking the evening timeslot as the abstract theme. In the following description, the cluster-based play list PL taking the evening timeslot as the abstract theme is referred to as an evening play list PL.

Likewise, the registration section 19 registers audio data D1 each causing the listener to imagine the night timeslot on a cluster-based play list PL taking the night timeslot as the abstract theme. In the following description, the cluster-based play list PL taking the night timeslot as the abstract theme is referred to as a night play list PL.

Similarly, the registration section 19 registers audio data D1 each causing the listener to imagine the midnight timeslot on a cluster-based play list PL taking the midnight timeslot as the abstract theme. In the following description, the cluster-based play list PL taking the midnight timeslot as the abstract theme is referred to as a midnight play list PL.

Then, the reproduction apparatus 10 associates the morning play list PL, the daytime play list PL, the evening play list PL, the night play list PL and the midnight play list PL with pieces of time-slot information showing the morning timeslot, the day timeslot, the evening timeslot, the night timeslot and the mid-night timeslot respectively. For example, the morning timeslot is a timeslot between 5:00:00 to 10:59:59, the day timeslot is a timeslot between 11:00:00 to 15:59:59, the evening timeslot is a timeslot between 16:00:00 to 18:59:59, the night timeslot is a timeslot between 19:00:00 to 20:59:59 and the mid-night timeslot is between 21:00:00 to 4:59:59.

In addition, the reproduction apparatus 10 associates the five timeslot play lists PL, i.e., the morning play list PL, the daytime play list PL, the evening play list PL, the night play list PL and the midnight play list PL, with a channel referred to as a timeslot channel. Thus, when the user selects the timeslot channel in the course of execution of the list-based reproduction function, the reproduction apparatus 10 determines a timeslot including the present time at which the user selects the timeslot channel, selects a play list PL associated with the determined timeslot from the morning play list PL, the daytime play list PL, the evening play list PL, the night play list PL and the midnight play list PL and associates the selected play list PL with the timeslot channel. As a result, the reproduction section 11 reproduces an audio data D1 in accordance with a play list PL selected from the morning play list PL, the daytime play list PL, the evening play list PL, the night play list PL and the midnight play list PL as a play list associated with the timeslot channel, and lets the user listen to the audio data D1 either on a trial basis or not.

By the way, with the timeslot channel selected by the user, every time the reproduction section 11 starts reproduction of an audio data D1 in accordance with a play list PL selected from the morning play list PL, the daytime play list PL, the evening play list PL, the night play list PL and the midnight play list PL as a play list associated with the timeslot channel, the reproduction section 11 recognizes the present time and determines a play list PL associated with a timeslot including the recognized present time. If the play list PL determined at the start of the reproduction of the audio data D1 is the same play list PL as a play list PL presently associated with the timeslot channel, the reproduction section 11 does not change the assignment of the timeslot channel to one of the morning play list PL, the daytime play list PL, the evening play list PL, the night play list PL and the midnight play list PL, and the audio data D1 is reproduced as it is in accordance with the play list PL presently associated with the timeslot channel.

If the play list PL determined at the start of the reproduction of the audio data D1 is different from the play list PL presently associated with the timeslot channel, on the other hand, the play list PL determined at the start of the reproduction of the audio data D1 is used to replace the play list PL associated so far with the timeslot channel. As described earlier, the play list PL determined at the start of the reproduction of the audio data D1 is one of the morning play list PL, the daytime play list PL, the evening play list PL, the night play list PL and the midnight play list PL. By the same token, the play list PL associated with the timeslot channel is one of the morning play list PL, the daytime play list PL, the evening play list PL, the night play list PL and the midnight play list PL. Then, the reproduction section 11 reproduces an audio data D1 in accordance with the play list PL determined at the start of the reproduction and lets the user listen to the audio data D1 either on a trial basis or not.

As described above, when the user selects the timeslot channel in the course of execution of the list-based reproduction function, the play list PL for the timeslot recognized at the start of reproduction of an audio data D1 is newly associated with the timeslot channel to replace the play list PL presently associated with the timeslot channel. It is to be noted that both the play list PL determined at the start of the reproduction of the audio data D1 and the play list PL presently associated with the timeslot channel are each one of the morning play list PL, the daytime play list PL, the evening play list PL, the night play list PL and the midnight play list PL. The registration section 19 has always registered each D1 recorded in the recording medium 13 as an audio data D1 with its characteristic already analyzed by the analysis section 18 on one of the morning play list PL, the daytime play list PL, the evening play list PL, the night play list PL and the midnight play list PL. Thus, if the user selects the timeslot channel for the whole day, for example, as time goes by, the reproduction apparatus 10 sequentially assigns the timeslot channel to a properly play list PL selected from the morning play list PL, the daytime play list PL, the evening play list PL, the night play list PL and the midnight play list PL automatically and uses the selected play list PL currently associated with the timeslot channel in reproduction of audio data D1. In this way, the reproduction section 11 is capable of letting the user to listen to each D1 recorded in the recording medium 13 as an audio data D1 with its characteristic already analyzed by the analysis section 18 either on a trial basis or not.

In the case of the first embodiment, as internal components, the analysis section 18 employs a frequency analysis circuit for carrying out the frequency analysis process and a characteristic quantization circuit for carrying out the characteristic quantization process. In the analysis section 18, an audio data D1 read out from an internal memory is subjected to the frequency analysis process on the audio data D1 in the frequency analysis circuit. Then, the characteristic quantization circuit carries out the characteristic quantization process on the data obtained as a result of the frequency analysis process. In the analysis section 18, however, while the characteristic quantization circuit is carrying out the characteristic quantization process on the data obtained as a result of the frequency analysis process, the frequency analysis circuit reads out a new audio data D1 from the internal memory and carries out the frequency analysis process on the new audio data D1. In this way, during the content analysis processing carried out by the analysis section 18, while the frequency analysis circuit is carrying out the frequency analysis process on an audio data D1, the characteristic quantization circuit carries out the characteristic quantization process on another audio data D1 concurrently with the frequency analysis process. Thus, the characteristics of audio data D1 each having a characteristic unanalyzed yet can be analyzed with a high degree of efficiency.

In addition, in the case of the first embodiment, with the main unit of the reproduction apparatus 10 put in a power-on state, the reproduction apparatus 10 turns on a blue-color illumination lamp provided typically on the front face of the case of the reproduction apparatus 10 in order to notify the user that the power supply is in an on state. In addition, while the analysis section 18 is analyzing the characteristic of the audio data D1 having its characteristic unanalyzed yet in a standby state of the main unit of the reproduction apparatus 10, the reproduction apparatus 10 puts the blue-color illumination lamp in a relatively slowly blinking state in order to notify the user that the analysis section 18 is analyzing the characteristic of the audio data D1 having a characteristic unanalyzed yet. As the processing to analyze the characteristics of all audio data D1 each having its characteristic unanalyzed yet in the standby state is completed, the reproduction apparatus 10 makes a transition from the standby state to the power-off state. Upon the transition from the standby state to the power-off state, the reproduction apparatus 10 turns off the blue-color illumination lamp in order to notify the user that the main unit of the reproduction apparatus 10 is in the power-off state.

(1-3) Operations and Effects

In the configuration described above, the reproduction apparatus 10 records an audio data D1 read out from a recording medium mounted on the reproduction apparatus 10 or an audio data D1 downloaded from the external apparatus 15 by way of the network NT in the recording medium 13 along with an analysis flag set at a value indicating that the characteristic of the audio data D1 has not been analyzed. Then, when the reproduction apparatus 10 detects a state of a light processing load borne by the main unit of the reproduction apparatus 10, the reproduction apparatus 10 searches the recording medium 13 for an audio data D1 having its characteristic unanalyzed yet on the basis of the analysis flag and analyzes the characteristic of the audio data D1 found in the search process as the audio data D1 having its characteristic unanalyzed yet. As a result of the analysis, the reproduction apparatus 10 obtains characteristic numerical information SN representing the characteristic of the audio data D1. Then, the reproduction apparatus 10 determines a play list PL suitable for the characteristic of the audio data D1 on the basis of the characteristic numerical information SN, the first registration-condition table RET1 and the second registration-condition table RET2. Finally, the reproduction apparatus 10 registers the audio data D1 having its characteristic already analyzed on the play list PL.

As is obvious from the above description, the reproduction apparatus 10 analyzes the characteristic of the audio data D1 having its characteristic unanalyzed yet in a state of a light processing load borne by the main unit of the reproduction apparatus 10 and registers the audio data D1 having its characteristic already analyzed on a play list PL selected on the basis of the result of the analysis of the characteristic in advance. Thus, the reproduction apparatus 10 is capable of preventing a very heavy processing load from being borne in a process to reproduce an audio data D1 due to the process to analyze the characteristic of another audio data D1 as well as the first and second processes to register the other audio data D1 having its characteristic already analyzed on a play list PL selected on the basis of the result of the analysis of the characteristic.

In accordance with the configuration described above, when the reproduction apparatus 10 detects a state of a light processing load borne by the main unit of the reproduction apparatus 10, the reproduction apparatus 10 searches the recording medium 13 for an audio data D1 having its characteristic unanalyzed yet on the basis of the analysis flag and analyzes the characteristic of the audio data D1 found in the search process as the audio data D1 having its characteristic unanalyzed yet. Then, the reproduction apparatus 10 registers the audio data D1 having its characteristic already analyzed on a play list PL selected in accordance with the result of the analysis of the characteristic. Finally, the reproduction apparatus 10 reproduces audio data D1 in accordance with the play list PL. Thus, the reproduction apparatus 10 is capable of preventing a very heavy processing load from being borne in a process to reproduce an audio data D1 due to the process to analyze the characteristic of another audio data D1 as well as the first and second processes to register the other audio data D1 having its characteristic already analyzed respectively on first and second play lists PL selected on the basis of the result of the analysis of the characteristic. In addition, the reproduction apparatus 10 is capable of carrying out a stable operation to reproduce audio data D1.

When the reproduction apparatus 10 detects a state of a light processing load borne by the main unit of the reproduction apparatus 10 or detects a transition to a standby state, the reproduction apparatus 10 starts processing to analyze characteristics of audio data D1 each having its characteristic unanalyzed yet and register the audio data D1 having its characteristic already analyzed on play lists PL selected in accordance with the result of the analyses of the characteristics. The transition to a standby state is caused by an operation to turn off the power supply of the main unit of the reproduction apparatus 10 or caused by the fact that the user carries out no operations whatsoever during a predetermined period of time lapsing since the start of an idle state caused by the fact that the processing load borne by the reproduction section 11 has decreased to a value not exceeding a value determined in advance. Thus, the reproduction apparatus 10 is capable of carrying out the processing to analyze characteristics of audio data D1 each having its characteristic unanalyzed yet and registering the audio data D1 having its characteristic already analyzed on play lists PL selected in accordance with the result of the analyses of the characteristics without obstructing operations carried out by the user on the main unit of the reproduction apparatus 10. That is to say, the reproduction apparatus 10 is capable of carrying out the processing to analyze characteristics of audio data D1 each having its characteristic unanalyzed yet and register the audio data D1 having its characteristic already analyzed on play lists PL selected in accordance with the result of the analyses of the characteristics without making the user aware of the processing. Thus, when the user makes use of the main unit of the reproduction apparatus 10, the play lists PL have already been updated.

In addition to the processing carried out by the reproduction apparatus 10 to analyze characteristics of audio data D1 each having its characteristic unanalyzed yet and register the audio data D1 having its characteristic already analyzed on play lists PL selected in accordance with the result of the analyses of the characteristics upon detection of a state of a light processing load borne by the main unit of the reproduction apparatus 10 due to a transition to a standby state, the reproduction apparatus 10 also notifies the user of the fact that the number of audio data D1 recorded on the recording medium 13 as audio data D1 each having its characteristic unanalyzed yet has increased to a certain degree when such a high number of such audio data D1 is detected. Thus, if the user requests the reproduction apparatus 10 to carry out the processing to analyze characteristics of audio data D1 each having its characteristic unanalyzed yet and register the audio data D1 having its characteristic already analyzed on play lists PL selected in accordance with the result of the analyses of the characteristics, the reproduction apparatus 10 also starts the processing as well at the request made by the user. Thus, when the user requests the reproduction apparatus 10 to carry out the processing to analyze characteristics of audio data D1 each having its characteristic unanalyzed yet and register the audio data D1 having its characteristic already analyzed on play lists PL selected in accordance with the result of the analyses of the characteristics, the reproduction apparatus 10 is capable of responding immediately to the request made by the user. As a result, the reproduction apparatus 10 is capable of making the main unit of the reproduction apparatus 10 usable in a user-friendlier manner.

In a process carried out by the reproduction apparatus 10 to generate a list of audio data D1 each having its characteristic unanalyzed yet, pieces of information specifying the audio data D1 are rearranged into an order according to dates/times included in the content attribute information DAT as dates/times selected by the user. Thus, the characteristics of the audio data D1 are analyzed in accordance with the order in which the pieces of information specifying the audio data D1 have been rearranged and the audio data D1 each having its characteristic already analyzed are registered on play lists PL selected in accordance with the result of the analyses of the characteristics. As a result, the reproduction apparatus 10 is capable of registering the audio data D1 each having its characteristic already analyzed on the play lists PL by letting audio data D1 desired by the user take precedence of the others. Examples of the audio data D1 desired by the user are audio data D1 most recently recorded on the recording medium 13 and audio data D1 each sung by an artist serving as a favorite with the user.

When the reproduction apparatus 10 detects a state in which the number of audio data D1 recorded on the recording medium 13 as audio data D1 each having its characteristic unanalyzed yet increases to a certain degree, the reproduction apparatus 10 notifies the user of the fact that the number of audio data D1 recorded on the recording medium 13 as audio data D1 each having its characteristic unanalyzed yet has increased to a certain degree. Thus, the reproduction apparatus 10 is capable of prompting the user to set a state in which the reproduction apparatus 10 is capable of carrying out the processing to analyze characteristics of audio data D1 each having its characteristic unanalyzed yet and register the audio data D1 having its characteristic already analyzed on play lists PL selected in accordance with the result of the analyses of the characteristics. As a result, the reproduction apparatus 10 is capable of effectively preventing the characteristics of audio data D1 recorded on the recording medium 13 as contents D1 each having its characteristic unanalyzed yet from remaining unanalyzed as it is no matter how long the time passes and thus effectively preventing the audio data D1 from remaining unregistered onto play lists PL.

(1-4) Other Embodiments

As described so far, the first embodiment analyzes the characteristic of the audio data D1 transferred from a recording medium mounted on the reproduction apparatus 10 to the recording medium 13 or downloaded from an external apparatus 15 to the recording medium 13 by way of the network NT. However, the applications of the present invention are by no means limited to such a case. For example, the present invention can be applied to a configuration in which media is used as the recording medium. With this configuration, in a standby state or a state of a light processing load borne by the main unit of the reproduction apparatus 10, while an audio data D1 is being transferred from the media to the recording medium 13, the characteristic of the audio data D1 is analyzed and the audio data D1 having its characteristic already analyzed is registered on a play list PL selected in accordance with the result of the process to analyze the characteristic.

In the first embodiment described earlier, when the reproduction apparatus 10 detects a state of a light processing load borne by the main unit of the reproduction apparatus 10 or detects a transition to a standby state, the reproduction apparatus 10 starts processing to analyze characteristics of audio data D1 each having its characteristic unanalyzed yet and register the audio data D1 having its characteristic already analyzed on play lists PL selected in accordance with the result of the analyses of the characteristics. The transition to a standby state is caused by an operation carried out by the user to turn off the power supply of the main unit of the reproduction apparatus 10. In other cases, the transition to a standby state is automatically made from an idle state due to the fact that the user carries out no operations whatsoever during a predetermined period of time lapsing since the start of the idle state, which is caused the fact that the processing load borne by the reproduction section 11 has decreased to a value not exceeding a value determined in advance. That is to say, the transition to a standby state is automatically made from an idle state because the reproduction apparatus 10 detects a state of a light processing load borne by the main unit of the reproduction apparatus 10 in the idle state. However, the scope of the present invention is by no means limited to this scheme. For example, it is also possible to provide a configuration in which, instead of making a transition from the idle state to the standby state because the reproduction apparatus 10 detects a state of a light processing load borne by the main unit of the reproduction apparatus 10 in the idle state as described above, the reproduction apparatus 10 automatically starts processing to analyze characteristics of audio data D1 each having its characteristic unanalyzed yet and register the audio data D1 having its characteristic already analyzed on play lists PL selected in accordance with the result of the analyses of the characteristics when the reproduction apparatus 10 detects a state of a light processing load borne by the main unit of the reproduction apparatus 10 in the idle state without making a transition from the idle state to the standby state.

In addition, in the first embodiment described earlier, the process to analyze the characteristic of the audio data D1 having its characteristic unanalyzed yet is followed by the first and second processes to register the audio data D1 having its characteristic already analyzed on first and second play lists selected on the basis of the result of the analysis of the characteristic. However, the scope of the present invention is by no means limited to this scheme. For example, it is also possible to provide a configuration in which the process to analyze the characteristic of the audio data D1 having its characteristic unanalyzed yet is followed by only the first or second process.

On top of that, in the first embodiment described earlier, when the reproduction apparatus 10 detects a state in which the number of audio data D1 recorded on the recording medium 13 among all audio data D1 as audio data D1 each having its characteristic unanalyzed yet increases to a certain degree, the reproduction apparatus 10 notifies the user of the fact that the number of audio data D1 recorded on the recording medium 13 as audio data D1 each having its characteristic unanalyzed yet has increased to a certain degree. However, the scope of the present invention is by no means limited to this scheme. For example, it is also possible to provide a configuration in which, when even only one audio data D1 is recorded on the recording medium 13 as an audio data D1 having its characteristic unanalyzed yet, the reproduction apparatus 10 immediately notifies the user of the fact that an audio data D1 has been recorded on the recording medium 13 as an audio data D1 having its characteristic unanalyzed yet.

In addition, in the first embodiment described earlier, a play list PL making use of a predetermined number of clusters can be a morning play list PL, a daytime play list PL, an evening play list PL, a night play list PL and a midnight play list PL. However, the scope of the present invention is by no means limited to this scheme. For example, it is also possible to provide a configuration different from the first embodiment. In this configuration, the play list PL making use of a predetermined number of clusters is a play list PL, the abstract theme determined for which is the installation location of the reproduction apparatus 10. Examples of the play list PL with the installation location of the reproduction apparatus 10 taken as the abstract theme determined for the play list PL are a living-room play list PL, a bedroom play list PL, an office play list PL and a train play list PL to mention a few.

(2) Second Embodiment

Figure 24:
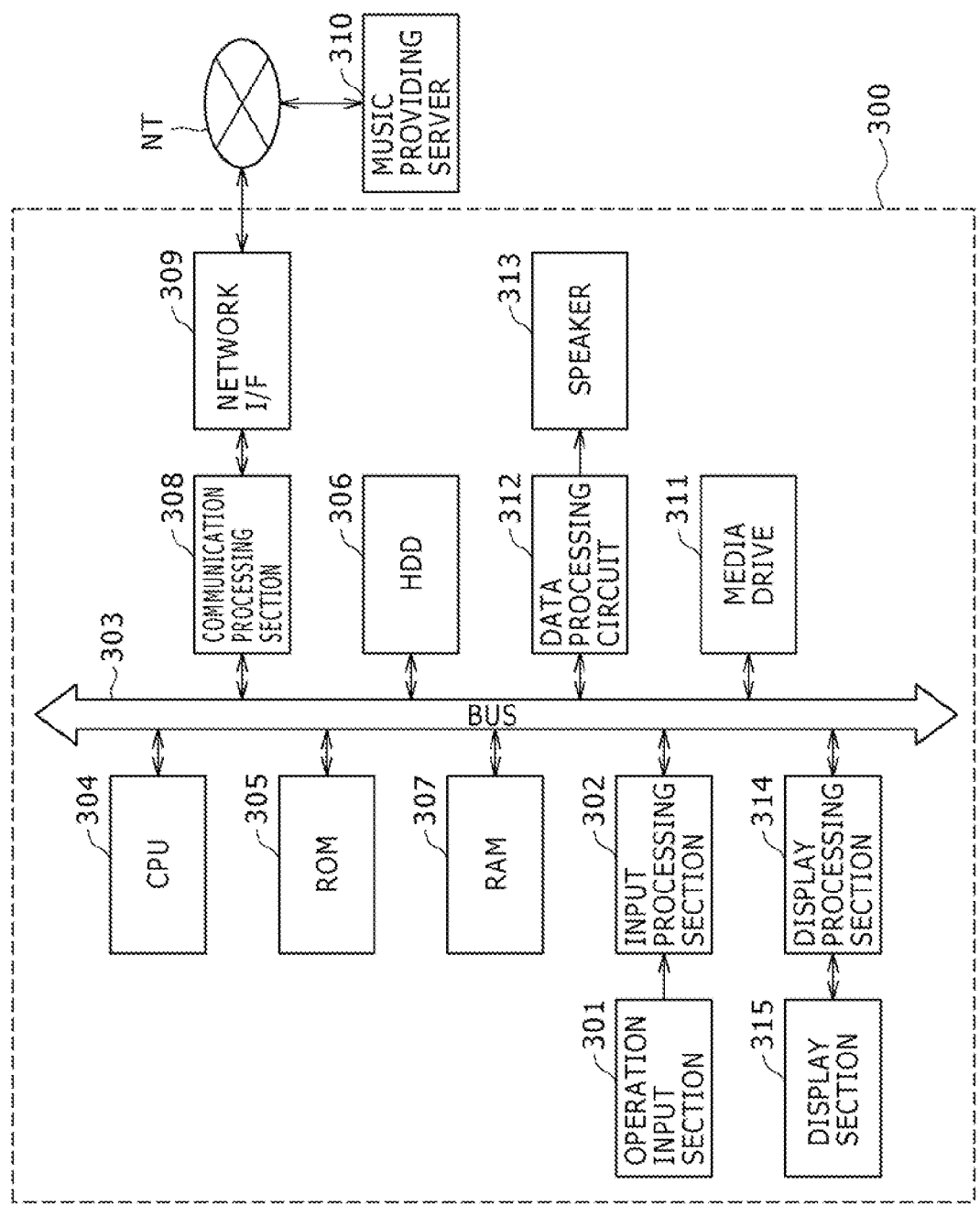
FIG. 24 is a block diagram showing the circuit configuration of a reproduction apparatus according to a second embodiment.

FIG. 24 is a block diagram showing the hardware circuit configuration of a reproduction apparatus 300 according to a second embodiment. In the reproduction apparatus 300 shown in the figure, when the user operates an operation input section 301, the operation input section 301 recognizes the operation carried out by the user and supplies an operation input signal representing the operation to an input processing section 302. The input processing section 302 carries out predetermined processing on the operation input signal in order to convert the signal into an operation command and supplies the command to a CPU (Central Processing Unit) 304 through a bus 303. The operation input section 301 including various operation buttons can be provided in a remote controller (not shown) or the body surface of the reproduction apparatus 300.

The CPU 304 is a section for carrying out various kinds of processing by execution of a variety of programs stored in a ROM (Read Only Memory) 305 in advance or programs loaded from an HDD (Hard Disk Drive) 306 into a RAM (Random Access Memory) 307 through the bus 303. The programs include a basic program and application programs. The processing carried out by the CPU 304 includes control of the entire reproduction apparatus 300, computation processes determined in advance and a variety of processes according to operation commands entered by the user via the operation input section 301 and supplied to the CPU 304 by way of the input processing section 302. The RAM 307 is a memory also used for properly storing various kinds of information such as data required in execution of the processing carried out by the CPU 304. The CPU 304, the ROM 305 and the RAM 307 are connected to each other by the bus 303 cited earlier.

The CPU 304 is connected to a network NT through the bus 303, a communication processing section 308 and a network I/F 309, which are connected to form a series circuit in a direction from the CPU 304 to the network NT so that the CPU 304 is capable of making accesses to a music providing server 310 connected to the network NT. The music providing server 310 is an apparatus for storing a large number of audio data D1 in a format determined in advance.

When the user operates the operation input section 301 in order to enter an operation input signal serving as a request to download a desired audio data D1 from the music providing server 310, the operation input signal is supplied to the input processing apparatus 302. The input processing apparatus 302 converts the operation input signal into a command supplied to the CPU 304. In accordance with this command, the CPU 304 makes an access to the music providing server 310 in order to request the music providing server 310 to download the desired audio data D1 to the reproduction apparatus 300. As a result, the CPU 304 downloads the desired audio data D1 from the music providing server 310 through the network NT, the network I/F 309, the communication processing section 308 and the bus 303, which are connected to form a series circuit in a direction from the music providing server 310 to the CPU 304. The CPU 304 passes on the audio data D1 to the HDD 306 to be stored in the HDD 306.

When the user operates the operation input section 301 in order to enter an operation input signal requesting that an audio data D1 be transferred from a recording medium mounted on a media drive 311 to the HDD 306, the operation input signal is supplied to the input processing apparatus 302. The input processing apparatus 302 converts the operation input signal into a command supplied to the CPU 304. In accordance with this command, the CPU 304 reads out the audio data D1 from the recording medium such as a CD (Compact Disc) and supplies the content D1 to a data processing circuit 312 having typically the configuration of a DSP (Digital Signal Processor). The data processing circuit 312 is a section for compressing and coding the audio data D1 read out from the recording medium and supplying the result of the compressing and coding processes to the HDD 306 to be stored in the HDD 306.

When the user operates the operation input section 301 in order to enter an operation input signal specifying an audio data D1 stored in the HDD 306 and requesting that the specified audio data D1 be reproduced, the operation input signal is supplied to the input processing apparatus 302. The input processing apparatus 302 converts the operation input signal into a command supplied to the CPU 304. In accordance with this command, the CPU 304 reads out the audio data D1 from the HDD 306 and supplies the content D1 to the data processing circuit 312. The data processing circuit 312 carries out audio processing on the musical data and supplies an audio signal representing the result of the audio processing to a speaker 313. The audio processing includes a process to decode the musical data, a digital-to-analog process to convert digital data obtained as a result of the process to decode the musical data into an analog signal and a process to amplify the analog signal. In this way, the CPU 304 outputs music based on the audio signal to the user by way of the speaker 313 and lets the user listen to the music.

A hard disk employed in the HDD 306 is a memory also used for storing a plurality of play lists PL of different kinds in addition to audio data D1. When the user operates the operation input section 301 in order to enter an operation input signal serving as a signal specifying a play list PL stored in the HDD 306 and requesting that a plurality of audio data D1 be reproduced in accordance with the play list PL, the operation input signal is supplied to the input processing apparatus 302. The input processing apparatus 302 converts the operation input signal into a command supplied to the CPU 304. In accordance with this command, the CPU 304 reads out the play list PL from the HDD 306. Then, the CPU 304 sequentially reads out the audio data D1 registered on the play list PL from the HDD 306 in accordance with the play list PL and supplies the contents D1 to the data processing circuit 312. The data processing circuit 312 carries out audio processing on each of the musical data and supplies an audio signal representing the result of the audio processing to a speaker 313. As described above, the audio processing includes a process to decode the musical data, a digital-to-analog process to convert digital data obtained as a result of the process to decode the musical data into an analog signal and a process to amplify the analog signal. In this way, the CPU 304 outputs music based on the audio signals representing the audio data D1 to the user by way of the speaker 313 and lets the user continuously listen to the music changing sequentially from one audio data D1 to another.

In addition, the CPU 304 also generates display data as results of executing a variety of programs such as a program to acquire an audio data D1 from a recording medium mounted on the reproduction apparatus 300 or an audio data D1 from the music providing server 310, a program to record an audio data D1 onto the HDD 306 and a program to reproduce an audio data D1 from a recording medium or the HDD 306. The display processing section 314 then supplies the display data to a display processing section 314. The display processing section 314 is a section for displaying a screen based on the display data received from the CPU 304 on a display section 315. In this way, the display section 315 shows a variety of screens to the user. The screens include a content acquisition screen, a content recording screen and a content reproduction screen.

As described above, in the reproduction apparatus 300, the CPU 304 is basically a section for carrying out various kinds of processing by execution of a variety of programs stored in the ROM 305 in advance or programs loaded from the HDD 306 into the RAM 307 and for controlling pieces of hardware employed in the reproduction apparatus 300. Thus, by properly designing the programs stored in the ROM 305 and/or the HDD 306 in advance to serve as the control module 100, the analysis module 101 and the management module 102, which have been explained earlier by referring to the flowchart shown FIG. 23, in accordance with the functions of the reproduction apparatus 10 having the hardware configuration described before by referring to the functional block diagram of FIG. 2, the CPU 304 is capable of functioning in the same way as the analysis section 18 and the registration section 19 included in the hardware configuration shown in FIG. 2. Of course, by implementing each of the control module 100, the analysis module 101 and the management module 102, which have been explained earlier by referring to the flowchart shown FIG. 23, as a functional circuit block, the reproduction apparatus 300 can be used as a reproduction apparatus having a hardware configuration including sections carrying out the functions of the analysis module 101 and the management module 102. In addition, the media drive 311, the data processing circuit 312 and the speaker 313, which are employed in the reproduction apparatus 300, can also be designed to function in the same way as the reproduction section 11 included in the hardware configuration shown in FIG. 2. By the same token, the operation input section 301 and the input processing section 302, which are employed in the reproduction apparatus 300, can also be designed to function in the same way as the operation section 12 included in the hardware configuration shown in FIG. 2. Likewise, the HDD 306 employed in the reproduction apparatus 300 can also be designed to function in the same way as the recording medium 13 included in the hardware configuration shown in FIG. 2. Similarly, the communication processing section 308 and the network I/F 309, which are employed in the reproduction apparatus 300, can also be designed to function in the same way as the communication section 14 included in the hardware configuration shown in FIG. 2.

By the same token, the display processing section 314 employed in the reproduction apparatus 300 can also be designed to function in the same way as the display processing section 16 included in the hardware configuration shown in FIG. 2. Likewise, the display section 315 employed in the reproduction apparatus 300 can also be designed to function in the same way as the display section 17 included in the hardware configuration shown in FIG. 2. The music providing server 310 corresponds to the external apparatus 15 included in the hardware configuration shown in FIG. 2. Thus, by properly designing the programs stored in the ROM 305 and/or the HDD 306 in advance to serve as the reproduction apparatus 10, the reproduction apparatus 300 is capable of carrying out the same processing as the reproduction apparatus 10 in order to exhibit the same effects as the first embodiment described before.

By the way, by properly designing the programs stored in the ROM 305 and/or the HDD 306 in advance, the CPU 304 employed in the reproduction apparatus 300 can be configured to function in the same way as the characteristic quantization circuit employed in the analysis section 18 whereas the data processing circuit 312 employed in the reproduction apparatus 300 can be configured to function in the same way as the frequency analysis circuit employed in the analysis section 18. Thus, the CPU 304 employed in the reproduction apparatus 300 is capable of analyzing characteristics of audio data D1 in conjunction with the data processing circuit 312 also employed in the reproduction apparatus 300 with a high degree of efficiency in the same way as the reproduction apparatus 10 explained before by referring to FIG. 2.

(3) Other Embodiments

The first and second embodiments described above implement a reproduction apparatus according to the present invention as the reproduction apparatus 1, 10 and 300 explained before by referring to FIGS. 1 to 24. It is to be noted, however, that the reproduction apparatus according to the present invention are by no means limited to the reproduction apparatus 1, 10 and 300. That is to say, the present invention can be applied to a wide range of reproduction apparatus of various kinds. Examples of the reproduction apparatus of other types are information processing apparatus, content reproduction apparatus and content recording/reproduction apparatus. The information processing apparatus include a personal computer, a hand phone and a PDA (Personal Digital Assistant) whereas the content reproduction apparatus can be a portable music reproduction apparatus or a stationary music reproduction apparatus. Examples of the content recording/reproduction apparatus include a DVD (Digital Versatile Disc) recorder and a hard disk recorder.

In addition, it should be understood by those skilled in the art that a variety of modifications, combinations, sub-combinations and alterations may occur in dependence on design requirements and other factors insofar as they are within the scope of the appended claims or the equivalents thereof.

The present invention can be applied to a content reproduction apparatus such as a musical-content reproduction apparatus capable or reproducing audio data in accordance with a play list.

What is claimed is:

1. A reproduction apparatus for reproducing audio data, said reproduction apparatus comprising:
an analysis section configured to start an analysis of characteristics of audio data recorded on a recording medium as audio data having its characteristic previously unanalyzed upon detection of a predetermined state of a light processing load borne by said reproduction apparatus;
a registration section configured to register audio data having its characteristic already analyzed on a specific play list prescribing an order of reproduction of audio data on the basis of said characteristics of said audio data; and
a reproduction section configured to reproduce audio data from said recording medium in accordance with said specific play list, wherein
said analysis section turns off a power supply of a main unit of said reproduction apparatus when said analysis section completes said analysis of characteristics of audio data having its characteristic previously unanalyzed.

2. The reproduction apparatus according to claim 1 wherein said predetermined state is a standby state.

3. The reproduction apparatus according to claim 2 wherein said reproduction apparatus enters said standby state on the basis of a power-supply turning-off operation carried out on an operation section.

4. The reproduction apparatus according to claim 2 wherein said reproduction apparatus enters said standby state as a time period determined in advance lapses since said reproduction section stops reproduction of audio data.

5. The reproduction apparatus according to claim 2 wherein said reproduction apparatus enters said standby state when an operation has not been carried out on an operation section for a continuous time period determined in advance.

6. The reproduction apparatus according to claim 2 wherein said analysis section:
rearranges audio data recorded on said recording medium as audio data having its characteristic previously unanalyzed on the basis of attribute information of said audio data; and
analyzes characteristics of said audio data having its characteristic unanalyzed yet in an order in which said audio data has been rearranged.

7. The reproduction apparatus according to claim 1, said reproduction apparatus further comprising:
a display control section configured to display information indicating existence of audio data having its characteristic previously unanalyzed on a display section if audio data having its characteristic previously unanalyzed exists in said recording medium.

8. The reproduction apparatus according to claim 1 wherein said analysis section discontinues said analysis of characteristics of audio data having its characteristic previously unanalyzed if said data having its characteristic previously unanalyzed has been damaged.

9. The reproduction apparatus according to claim 1, said reproduction apparatus further comprising:
a lighting section configured to stay in an on state while said analysis section is analyzing characteristics of audio data having its characteristic previously unanalyzed.

10. A reproduction apparatus for reproducing audio data, said reproduction apparatus comprising:
an analysis section configured to start an analysis of characteristics of audio data recorded on a recording medium as audio data having its characteristic previously unanalyzed on the basis of a power-supply turning-off operation carried out on an operation section, which places said reproduction apparatus into a predetermined state of a light processing load borne by said reproduction apparatus;
a registration section configured to register audio data having its characteristic already analyzed on a specific play list prescribing an order of reproduction of audio data on the basis of said characteristics of said audio data; and
a reproduction section configured to reproduce audio data from said recording medium in accordance with said specific play list, wherein
said analysis section turns off a power supply of a main unit of said reproduction apparatus when said analysis section completes said analysis of characteristics of audio data having its characteristic previously unanalyzed.

11. A reproduction apparatus for reproducing audio data, said reproduction apparatus comprising:
an analysis section configured to analyze characteristics of audio data recorded on a recording medium as audio data having its characteristic previously unanalyzed;
a registration section configured to register audio data having its characteristic already analyzed by said analysis section on a specific play list prescribing an order of reproduction of audio data on the basis of said characteristics of said audio data; and a reproduction section configured to reproduce audio data from said recording medium in accordance with said specific play list, wherein said analysis section starts a process to analyze characteristics of audio data having its characteristic previously unanalyzed as a time period determined in advance lapses since said reproduction section stops reproduction of audio data, which causes said reproduction apparatus to enter a predetermined state of a light processing load borne by said reproduction apparatus, and said analysis section turns off a power supply of a main unit of said reproduction apparatus when said analysis section completes said analysis of characteristics of audio data having its characteristic previously unanalyzed.

12. A reproduction apparatus for reproducing audio data, said reproduction apparatus comprising:

an analysis section configured to start an analysis of characteristics of audio data recorded on a recording medium as audio data having its characteristic previously unanalyzed when an operation has not been carried out on an operation section for a continuous time period determined in advance, which causes said reproduction apparatus to enter a predetermined state of a light processing load borne by said reproduction apparatus;

a registration section configured to register audio data having its characteristic already analyzed by said analysis section on a specific play list prescribing an order of reproduction of audio data on the basis of said characteristics of said audio data; and a reproduction section configured to reproduce audio data from said recording medium in accordance with said specific play list, wherein said analysis section turns off a power supply of a main unit of said reproduction apparatus when said analysis section completes said analysis of characteristics of audio data having its characteristic previously unanalyzed.

13. A reproduction method for reproducing audio data by a reproduction apparatus, said reproduction method comprising:

starting an analysis of characteristics of audio data recorded on a recording medium as audio data having its characteristic previously unanalyzed upon detection of a predetermined state of a light processing load borne by a reproduction apparatus;

registering audio data having its characteristic already analyzed on a specific play list prescribing an order of reproduction of audio data on the basis of said characteristics of said audio data;

reproducing audio data from said recording medium in accordance with said specific play list; and turning off a power supply of a main unit of said reproduction apparatus when said analysis of characteristics of audio data having its characteristic previously unanalyzed is completed.

14. A reproduction method for reproducing audio data by a reproduction apparatus, said reproduction method comprising:

starting an analysis of characteristics of audio data recorded on a recording medium as audio data having its characteristic previously unanalyzed on the basis of a power-supply turning-off operation carried out on an operation section, which places said reproduction apparatus into a predetermined state of a light processing load borne by said reproduction apparatus;

registering audio data having its characteristic already analyzed on a specific play list prescribing an order of reproduction of audio data on the basis of said characteristics of said audio data;

reproducing audio data from said recording medium in accordance with said specific play list; and turning off a power supply of a main unit of said reproduction apparatus when said analysis of characteristics of audio data having its characteristic previously unanalyzed is completed.

15. A reproduction method for reproducing audio data by a reproduction apparatus, said reproduction method comprising:

analyzing characteristics of audio data recorded on a recording medium as audio data having its characteristic previously unanalyzed;

registering audio data having its characteristic already analyzed on a specific play list prescribing an order of reproduction of audio data on the basis of said characteristics of said audio data; and reproducing audio data from said recording medium in accordance with said specific play list, wherein said analyzing characteristics of audio data having its characteristic previously unanalyzed is started as a time period determined in advance lapses since an end of execution of said reproducing audio data, which causes said reproduction apparatus to enter a predetermined state of a light processing load borne by said reproduction apparatus; and turning off a power supply of a main unit of said reproduction apparatus when said analysis of characteristics of audio data having its characteristic previously unanalyzed is completed.

16. A reproduction method for reproducing audio data by a reproduction apparatus, said reproduction method comprising:

starting an analysis of characteristics of audio data recorded on a recording medium as audio data having its characteristic previously unanalyzed when an operation has not been carried out on an operation section for a continuous time period determined in advance, which causes said reproduction apparatus to enter a predetermined state of a light processing load borne by said reproduction apparatus;

registering audio data having its characteristic already analyzed on a specific play list prescribing an order of reproduction of audio data on the basis of said characteristics of said audio data;

reproducing audio data from said recording medium in accordance with said specific play list; and turning off a power supply of a main unit of said reproduction apparatus when said analysis of characteristics of audio data having its characteristic previously unanalyzed is completed.

17. A recording medium recording a program readable by a reproduction apparatus for reproducing audio data according to a process, said process comprising:

starting an analysis of characteristics of audio data recorded on a recording medium as audio data having its characteristic previously unanalyzed upon detection of a predetermined state of a light processing load borne by a reproduction apparatus;

registering audio data having its characteristic already analyzed on a specific play list prescribing an order of reproduction of audio data on the basis of said characteristics of said audio data;

reproducing audio data from said recording medium in accordance with said specific play list; and turning off a power supply of a main unit of said reproduction apparatus when said analysis of characteristics of audio data having its characteristic previously unanalyzed is completed.

* * * * *